United States Patent
Caylor et al.

(10) Patent No.: US 9,878,365 B2
(45) Date of Patent: Jan. 30, 2018

(54) CAN-MAKING APPARATUS WITH TRIMMER CHUTE

(71) Applicant: Silgan Containers LLC, Woodland Hills, CA (US)

(72) Inventors: Gunnar J. Caylor, Antelope, CA (US); David S. Revers, Waukesha, WI (US); Brandon Craig Garfoot, Stoughton, WI (US); James B. Moses, Galt, CA (US)

(73) Assignee: Silgan Containers LLC, Woodland Hills, CA (US)

( * ) Notice: Subject to any disclaimer, the term of this patent is extended or adjusted under 35 U.S.C. 154(b) by 85 days.

(21) Appl. No.: 15/159,582

(22) Filed: May 19, 2016

(65) Prior Publication Data
US 2016/0263645 A1    Sep. 15, 2016

Related U.S. Application Data

(63) Continuation of application No. PCT/US2013/071438, filed on Nov. 22, 2013.

(51) Int. Cl.
| | |
|---|---|
| *B21D 51/26* | (2006.01) |
| *B23D 19/08* | (2006.01) |
| *B23D 21/00* | (2006.01) |
| *B21D 43/16* | (2006.01) |

(52) U.S. Cl.
CPC ..... *B21D 51/2615* (2013.01); *B21D 51/2692* (2013.01); *B23D 19/08* (2013.01); *B23D 21/00* (2013.01); *B21D 43/16* (2013.01)

(58) Field of Classification Search
CPC ........ B21D 51/2615; B21D 51/2692; B21D 43/16; B23D 21/00; B23D 31/00

USPC ................. 83/162–164, 100–102
See application file for complete search history.

(56) References Cited

U.S. PATENT DOCUMENTS

| | | | | |
|---|---|---|---|---|
| 1,417,780 | A | * | 5/1922 | Stephens ............... B65G 11/083 138/120 |
| 2,298,366 | A | * | 10/1942 | Gladfelter ............... B21D 51/34 29/38 F |
| 2,658,603 | A | | 11/1953 | Fernald |
| 3,095,073 | A | | 6/1963 | Larson |
| 3,469,432 | A | * | 9/1969 | Langewis ............... B21D 43/16 72/361 |

(Continued)

FOREIGN PATENT DOCUMENTS

| | | |
|---|---|---|
| EP | 0648566 A1 | 4/1995 |
| WO | WO 2015/076823 A1 | 5/2015 |

OTHER PUBLICATIONS

International Search Report and Written Opinion regarding PCT/US2013/071438, dated Aug. 29, 2014, 10 pages.

(Continued)

*Primary Examiner* — Sean Michalski
(74) *Attorney, Agent, or Firm* — Reinhart Boerner Van Deuren s.c.

(57) ABSTRACT

A trimmer assembly for removing portions of sidewalls of cans is provided. The trimmer assembly includes a chute configured to receive the removed portions of sidewalls of cans. The chute includes an angled extending wall configured to prevent removed portions of sidewalls of cans from travelling past the chute without entering the chute without interfering with motion of the cans.

20 Claims, 22 Drawing Sheets

(56) References Cited

U.S. PATENT DOCUMENTS

| | | | |
|---|---|---|---|
| 3,864,995 A * | 2/1975 | Langewis | B21D 51/2615 82/101 |
| 3,894,455 A * | 7/1975 | Stroobants | B23D 31/001 82/56 |
| 3,916,740 A | 11/1975 | Stroobants | |
| 4,557,167 A * | 12/1985 | Cvacho | B21D 51/2615 72/71 |
| 4,821,861 A | 4/1989 | Shanahan | |
| 4,914,990 A * | 4/1990 | Hellweg | B23D 31/001 82/54 |
| 5,054,341 A | 10/1991 | Johansson et al. | |
| 5,146,818 A | 9/1992 | Hellweg | |
| 5,148,742 A | 9/1992 | Stirbis et al. | |
| D345,039 S | 3/1994 | Doyle | |
| 5,433,098 A | 7/1995 | Bowlin et al. | |
| 5,467,628 A | 11/1995 | Bowlin et al. | |
| 5,611,231 A | 3/1997 | Marritt et al. | |
| 5,676,006 A | 10/1997 | Marshall | |
| 5,694,822 A * | 12/1997 | Maidment | B23D 31/001 83/114 |
| 5,697,274 A * | 12/1997 | Maidment | B23D 31/001 83/114 |
| 5,704,241 A | 1/1998 | Babbitt et al. | |
| 5,706,686 A | 1/1998 | Babbitt et al. | |
| 5,916,317 A | 6/1999 | Willoughby et al. | |
| 6,079,244 A | 6/2000 | Robinson et al. | |
| 6,151,939 A | 11/2000 | Hanna et al. | |
| 6,167,743 B1 | 1/2001 | Marritt et al. | |
| 6,178,797 B1 | 1/2001 | Marshall et al. | |
| 6,186,304 B1 | 2/2001 | Hakansson | |
| 6,343,496 B1 | 2/2002 | Hanna et al. | |
| 6,510,938 B1 * | 1/2003 | Bowlin | B21D 51/2692 193/2 R |
| 6,619,946 B1 | 9/2003 | Marshall et al. | |
| 6,637,247 B2 | 10/2003 | Bowlin | |
| 6,661,020 B2 | 12/2003 | Schill et al. | |
| 6,752,000 B2 | 6/2004 | Reynolds et al. | |
| 6,752,052 B2 | 6/2004 | Bowlin | |
| 6,763,752 B2 | 7/2004 | Marshall et al. | |
| 6,886,682 B2 | 5/2005 | Bowlin et al. | |
| 6,905,249 B2 | 6/2005 | Schill et al. | |
| 6,968,763 B2 * | 11/2005 | Chapin | H05K 3/0097 53/255 |
| 7,201,031 B2 | 4/2007 | Shuey et al. | |
| 7,310,983 B2 | 12/2007 | Schill et al. | |
| 7,387,007 B2 | 6/2008 | Schill et al. | |
| 7,404,309 B2 | 7/2008 | Schill et al. | |
| 7,409,845 B2 | 8/2008 | Schill et al. | |
| 7,418,852 B2 | 9/2008 | Schill et al. | |
| 7,454,944 B2 | 11/2008 | Schill et al. | |
| 7,464,573 B2 | 12/2008 | Shortridge | |
| 7,497,145 B2 | 3/2009 | El Hachem et al. | |
| 7,530,445 B2 | 5/2009 | Marshall et al. | |
| 7,568,573 B2 | 8/2009 | Schill | |
| D620,964 S | 8/2010 | Yuyama | |
| 7,818,987 B2 | 10/2010 | Marshall | |
| 7,886,894 B2 | 2/2011 | Schill et al. | |
| 7,905,001 B2 | 3/2011 | Cheatham et al. | |
| 7,905,130 B2 | 3/2011 | Marshall et al. | |
| 7,918,328 B2 | 4/2011 | Schill et al. | |
| 7,921,529 B2 | 4/2011 | Cheatham et al. | |
| 7,938,049 B2 | 5/2011 | Reynolds et al. | |
| 7,950,259 B2 | 5/2011 | Marshall | |
| 7,963,139 B2 | 6/2011 | Shortridge et al. | |
| 8,020,686 B2 * | 9/2011 | Babineau | B65F 1/10 193/2 D |
| 8,297,098 B2 | 10/2012 | Marshal et al. | |
| 8,485,336 B2 | 6/2013 | Tenold | |
| D710,755 S | 8/2014 | Pier | |
| D710,912 S | 8/2014 | Wehmeier | |
| 9,073,693 B2 | 7/2015 | Thillen | |
| 2003/0145695 A1 | 8/2003 | Dicket | |
| 2004/0011169 A1 | 1/2004 | Marshall | |
| 2010/0212130 A1 | 8/2010 | Marshall | |
| 2010/0212385 A1 | 8/2010 | Marshall et al. | |
| 2010/0212393 A1 | 8/2010 | Babbitt et al. | |
| 2010/0212394 A1 | 8/2010 | Babbitt et al. | |
| 2010/0213030 A1 | 8/2010 | Green | |
| 2010/0213677 A1 | 8/2010 | Marshall et al. | |
| 2011/0164948 A1 | 7/2011 | Marshall et al. | |

OTHER PUBLICATIONS

Photos of a scrap ring chute believed to be commercially available and purchased from Belvac Production Machinery, Inc. before Nov. 22, 2012, 3 pages.

CC93 Trimmer Part One Operation, Safety, and Maintenance Manual for Belvac Production Machinery, Inc. CC93 trimmer purchased before Nov. 22, 2012. The CC93 Trimmer Part One Operation, Safety, and Maintenance Manual is believed to have been commercially available from Belvac Production Machinery, Inc. as of 2009, 36 pages.

CC93 Trimmer Part Two Machine Specifications, Installation, Troubleshooting, and Maintenance Manual for Belvac Production Machinery, Inc. CC93 trimmer purchased before Nov. 22, 2012. The CC93 Trimmer Part Two Machine Specifications, Installation, Troubleshooting, and Maintenance Manual is believed to have been commercially available from Belvac Production Machinery, Inc. as of 2009, 78 pages.

CC93 Trimmer Part Two Machine Specifications, Installation, Troubleshooting, and Maintenance Manual for Belvac Production Machinery, Inc. CC93 trimmer purchased before Nov. 22, 2012. The CC93 Trimmer Part Two Machine Specifications, Installation, Troubleshooting, and Maintenance Manual is believed to have been commercially available from Belvac Production Machinery, Inc. as of 2009, 75 pages.

\* cited by examiner

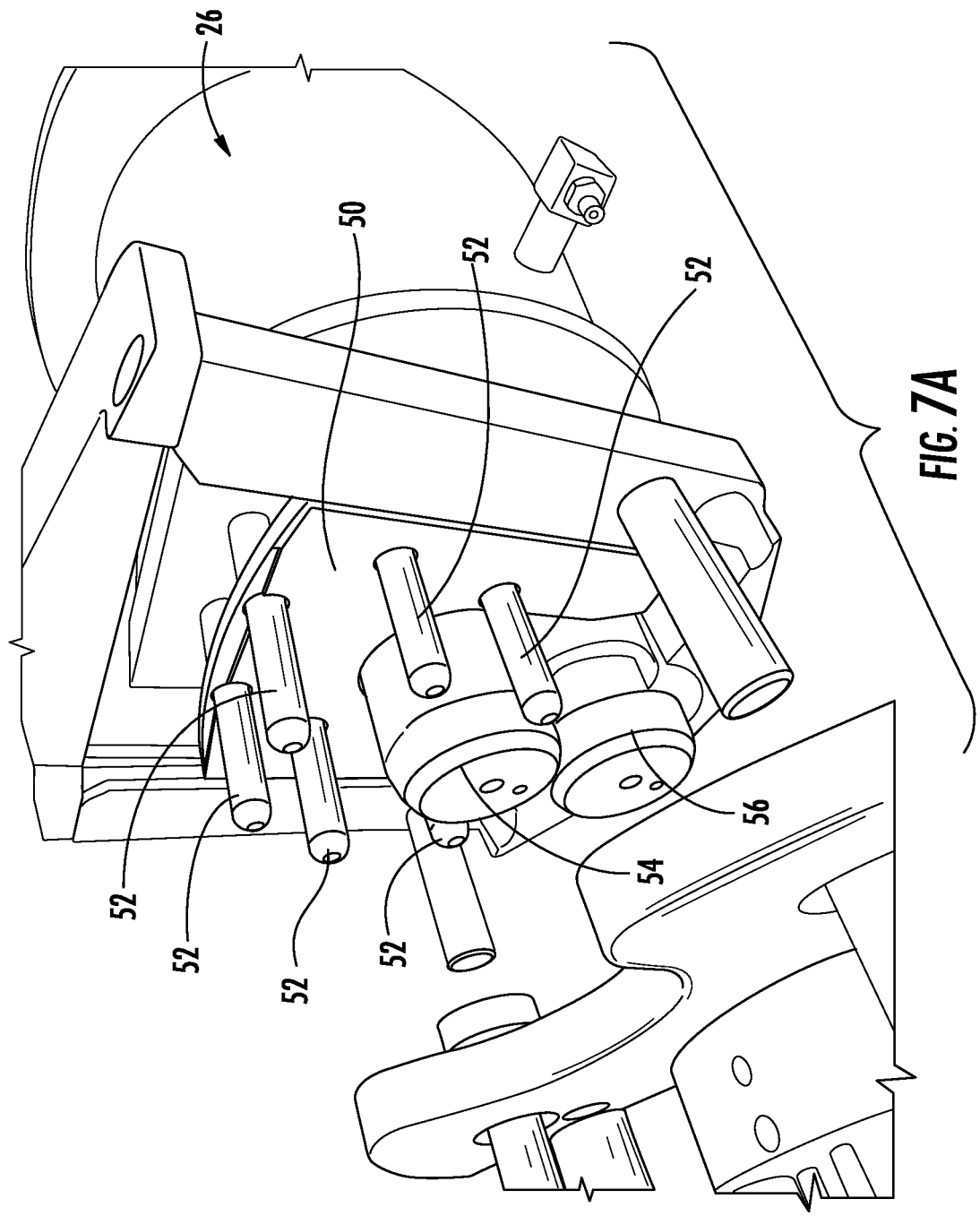

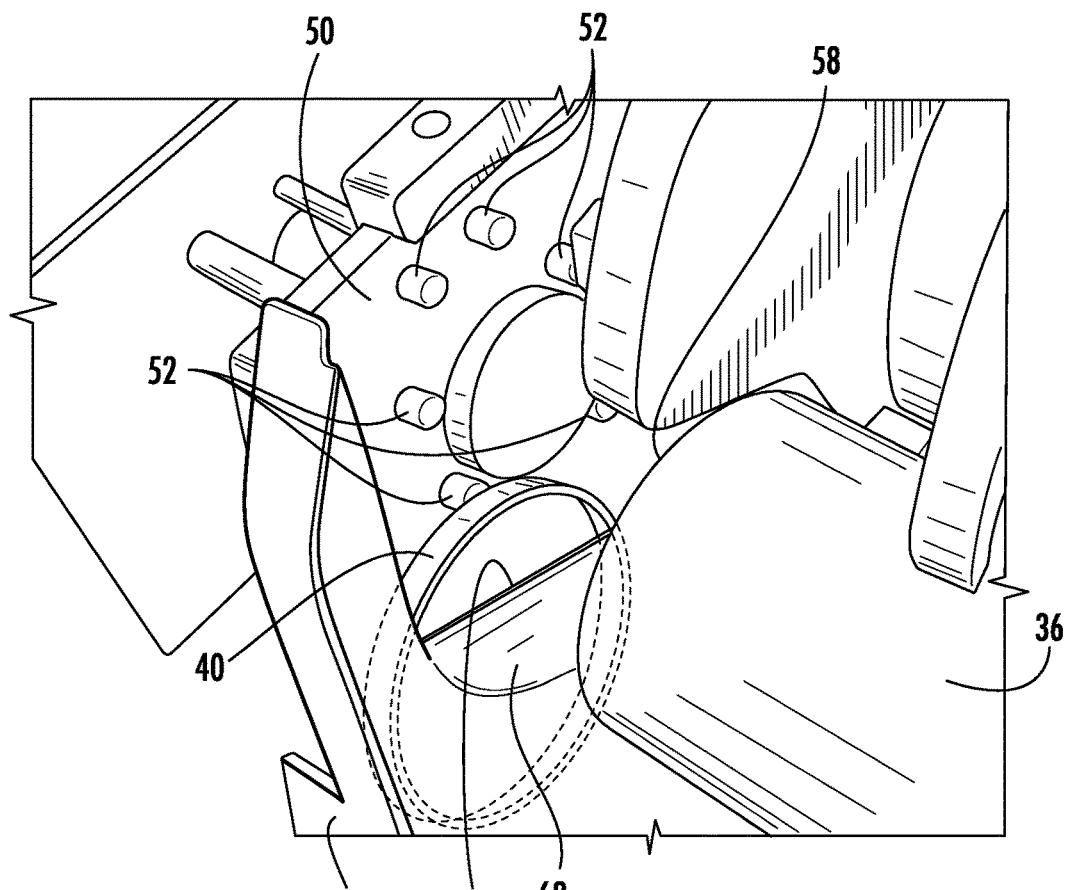
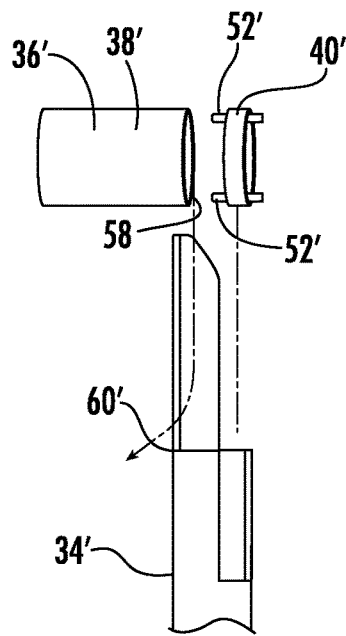 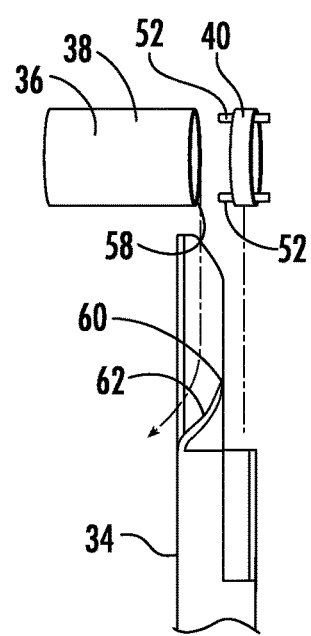
FIG. 10B  FIG. 10C

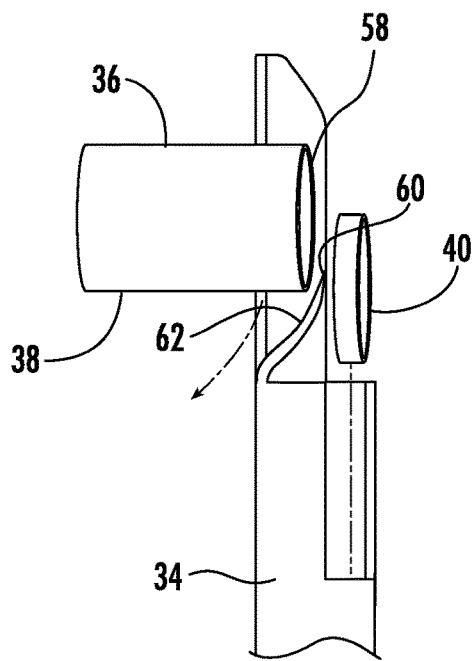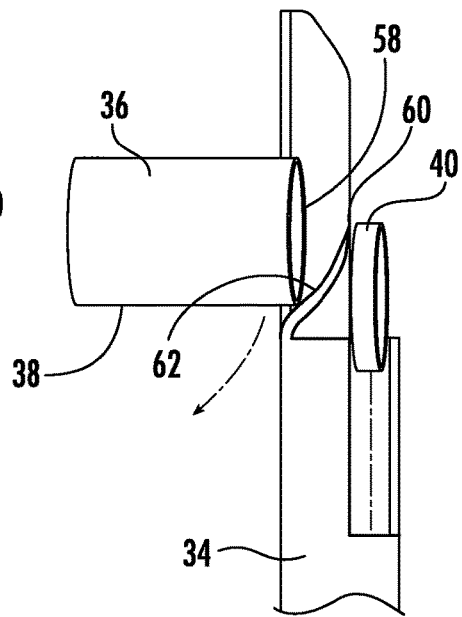
FIG. 10D  FIG. 10E
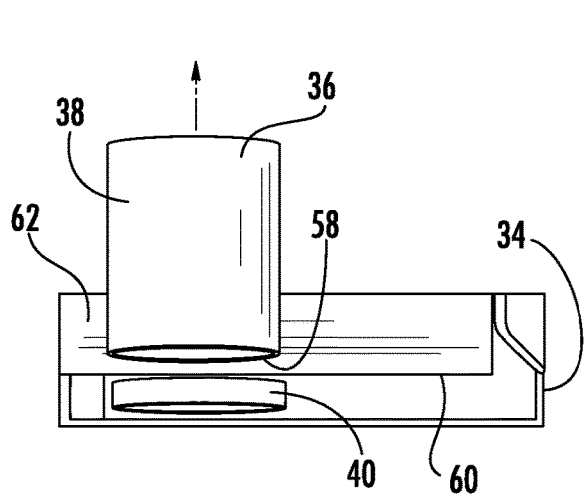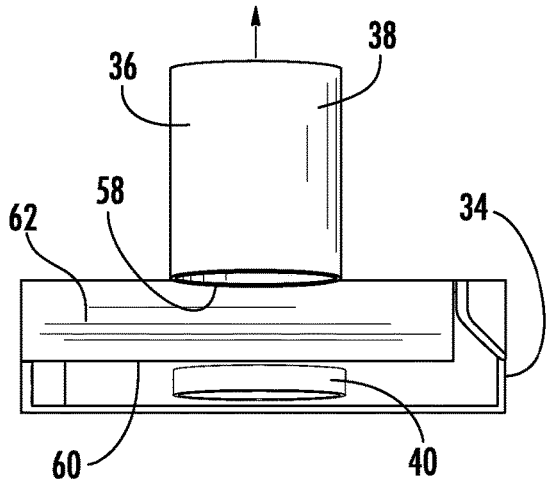
FIG. 10F  FIG. 10G

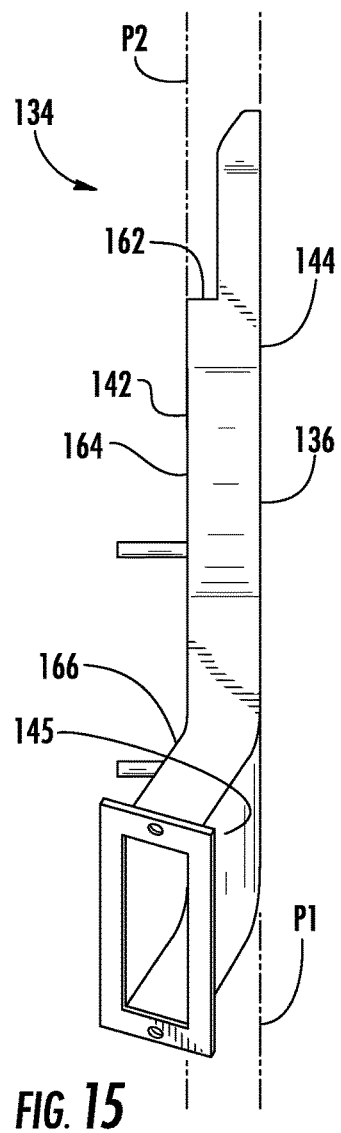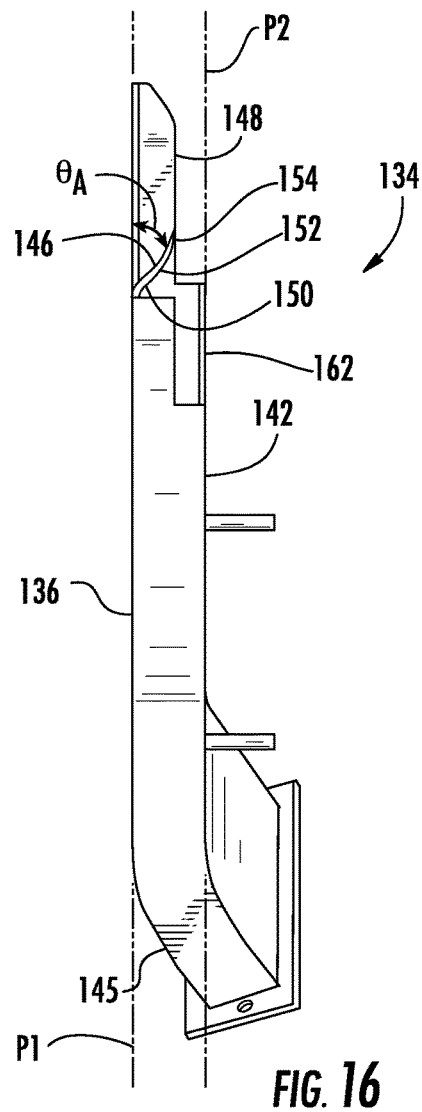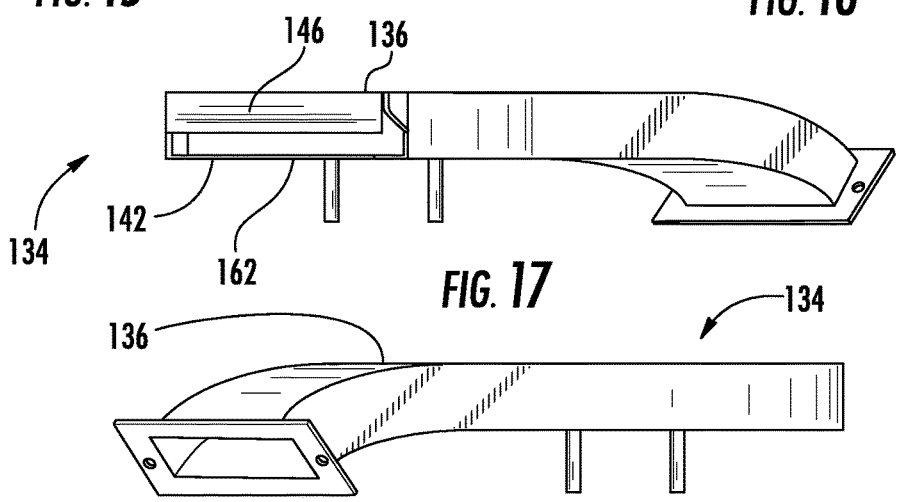

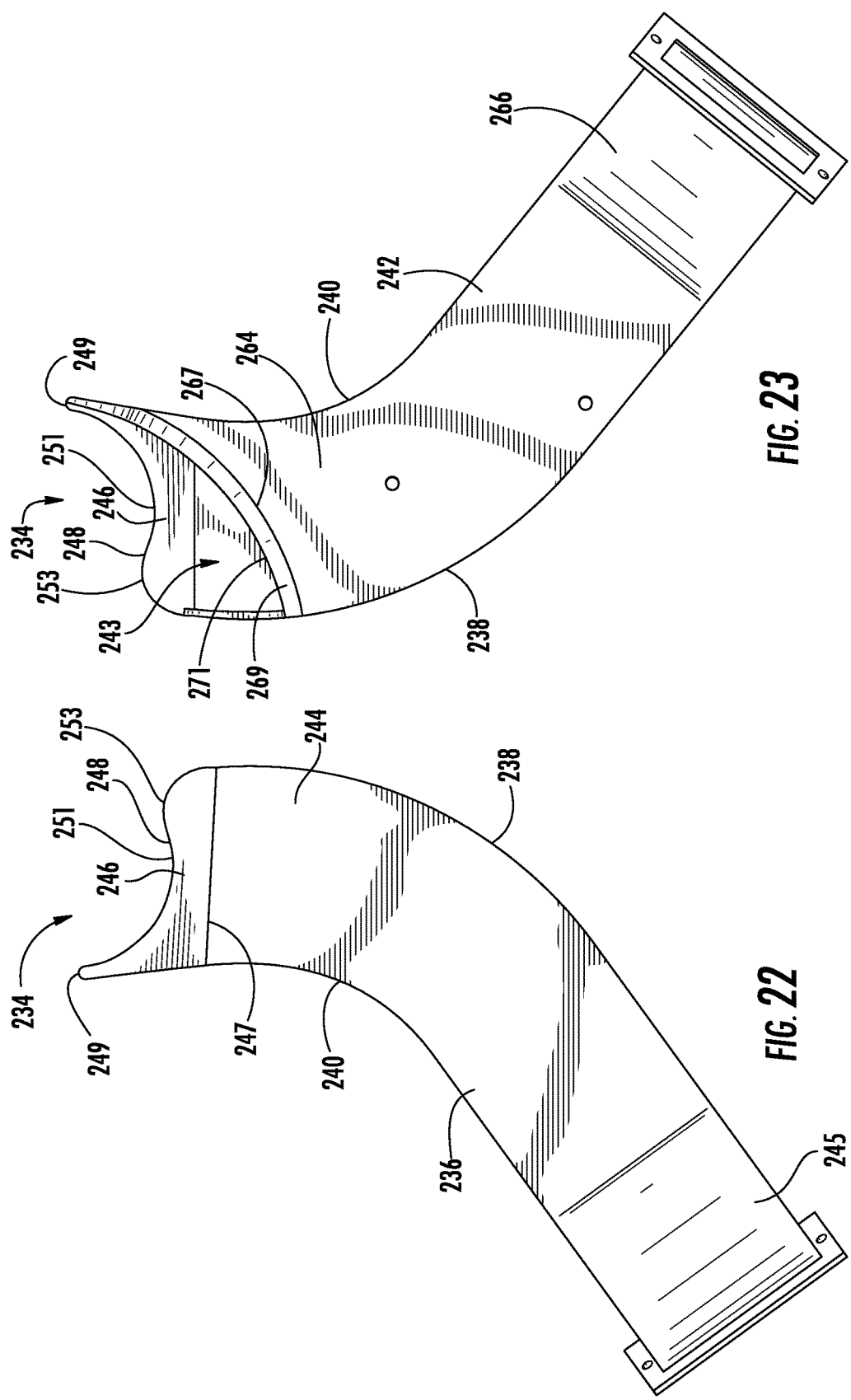

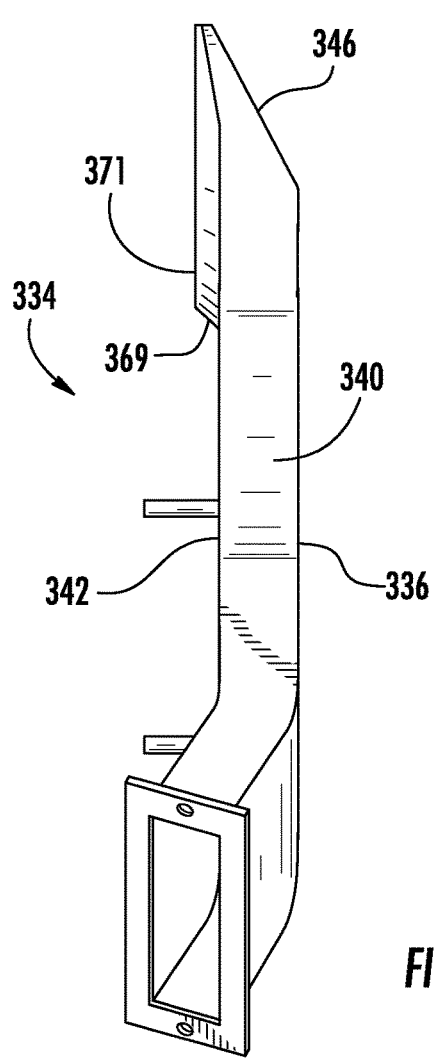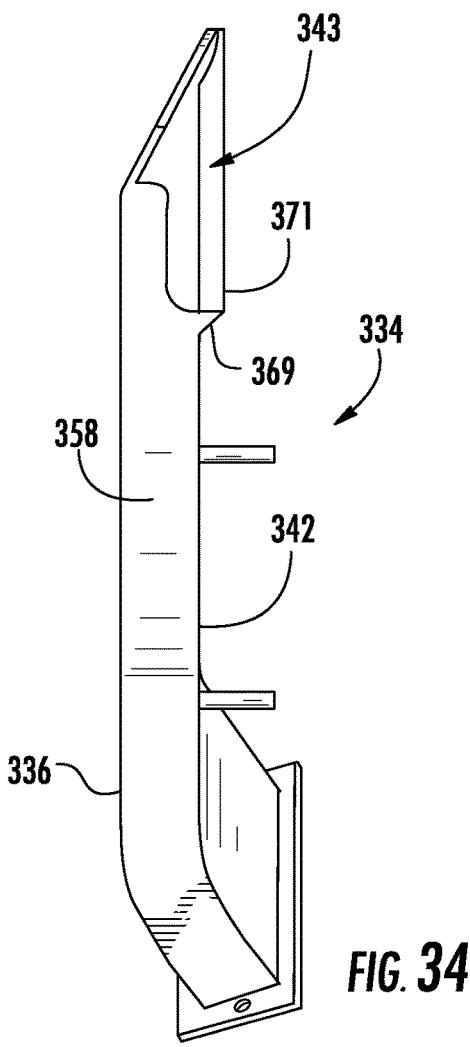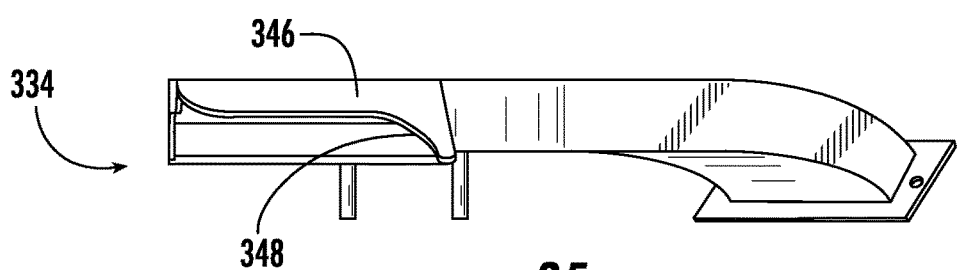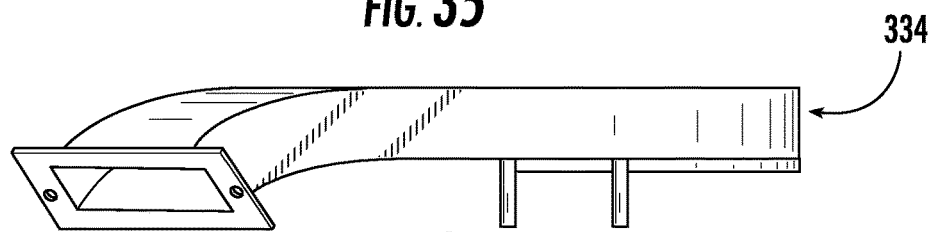

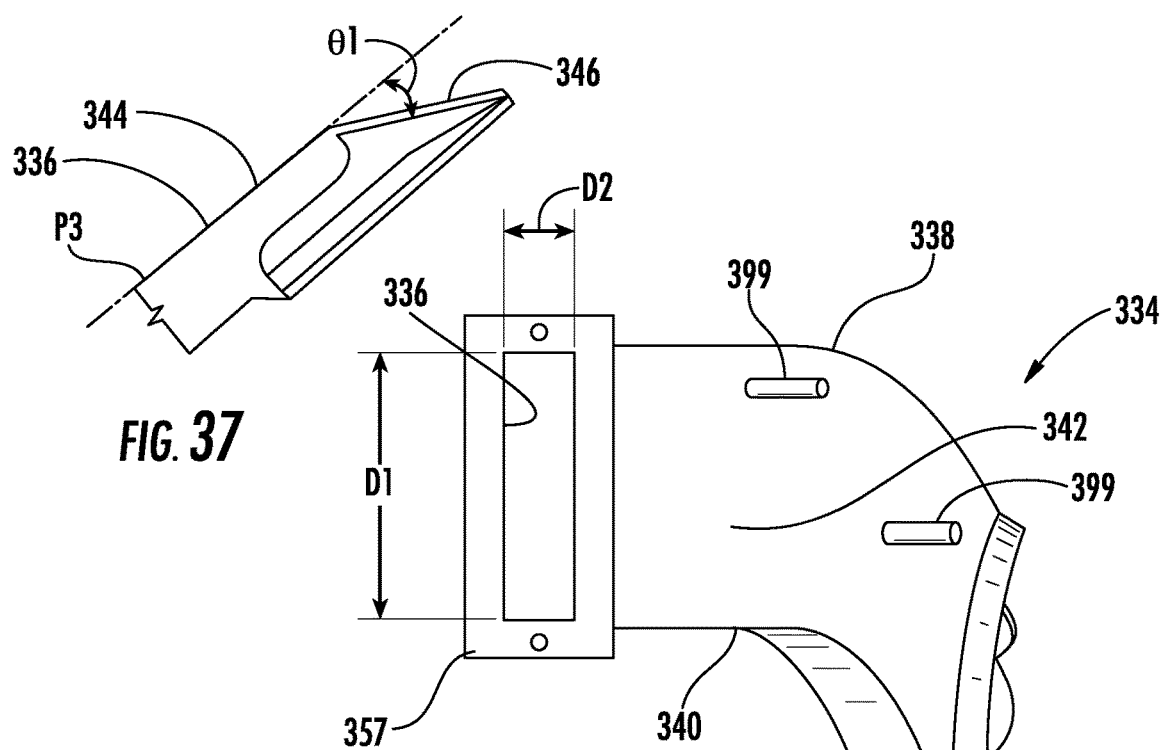
FIG. 37
FIG. 38
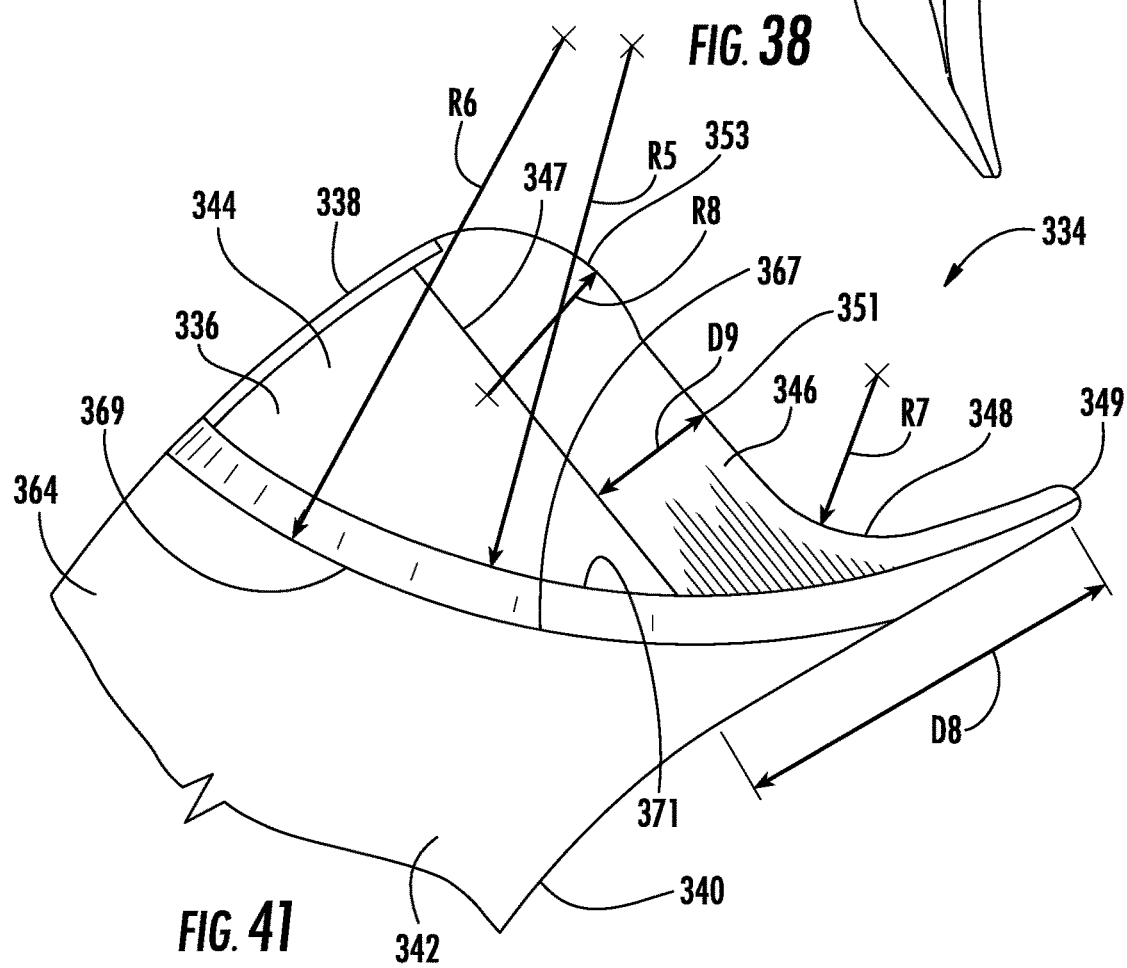
FIG. 41

CAN-MAKING APPARATUS WITH TRIMMER CHUTE

CROSS REFERENCE TO RELATED PATENT APPLICATIONS

This application claims priority to and benefit of PCT Application Number PCT/US2013/071438 filed Nov. 22, 2013 which is incorporated herein by reference in its entirety.

BACKGROUND OF THE INVENTION

The present invention relates generally to the field of can-making machines and more specifically to can-making machines with chutes configured to receive removed portions of sidewalls of cans.

SUMMARY OF THE INVENTION

One embodiment of the invention relates to a trimmer assembly for trimming metal cans. The trimmer assembly includes an infeed configured to deliver the metal cans. The trimmer assembly includes a discharge configured to receive the metal cans after being trimmed. The trimmer assembly includes a revolving assembly configured to receive each of the metal cans from the infeed and deliver the metal cans after being trimmed to the discharge. The revolving assembly is configured to revolve the metal cans around an axis. The trimmer assembly includes a cutter configured to remove a portion from each metal can. The trimmer assembly includes a chute configured to receive the removed portion of each metal can. The chute includes a first wall proximate the revolving assembly. The first wall includes a lower portion extending upwardly generally perpendicular to the axis. The first wall includes an upper portion extending upwardly non-perpendicular to the axis from the lower portion to a peripheral edge of the first wall. The upper portion is configured to prevent the removed portion of each metal can from moving past the chute in a direction parallel with the axis Another embodiment of the invention relates to a method of removing a portion of a sidewall from a can. The method includes rotating the can around its longitudinal axis. The method includes revolving the can around a first axis while moving the can toward a cutter configured to remove the portion of the sidewall. The method includes removing the portion of the sidewall of the can. The method includes revolving the can around the first axis while moving the can away from the cutter. At least a portion of the path of the can away from the cutter is parallel to an upper wall portion of a chute. The upper wall portion extends non-perpendicular to the first axis.

Another embodiment of the invention relates to a chute for receiving a removed portion of a sidewall of a can. The portion of the sidewall of the can has been removed by a cutter while the can is rotated about its central axis and removed around a first axis. The chute includes a first wall. The first wall includes a lower portion having an outer surface and an angled extending upper portion having an outer surface. The outer surface of the upper portion extends generally along a first plane from a first end proximate the lower portion to an upper peripheral edge. The outer surface of the lower portion extends generally along a second plane. The first and second planes are non-parallel and non-coplanar. The first plane extends at an angle of between approximately 15° and 40° relative to the second plane. The chute includes a second wall opposite the first wall extending from a first end to an upper peripheral edge. The chute includes a pair of sidewalls. The sidewalls extend between the first wall and the second wall. The first and second walls and the pair of sidewalls define an opening configured to receive the removed portion of the sidewall of the can and a passage extending from the opening. The upper peripheral edge of the upper portion of the first wall is located above the opening between the second wall and the lower portion of the first wall.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 7A is a detail view of a cutting cartridge without a can illustrated.

FIG. 10A is a detail view illustrating a trimmed can moving past the angled extending wall of an embodiment of a chute, with the removed portion of the sidewall of the can having been pushed off of the stripper pins by the stripper plate and falling into the chute.

FIGS. 10B and 10C show a side view of a chute without an angled extending wall and an embodiment of a chute with an angled extending wall illustrating that the front of the chute may be a greater height with an angled extending wall than a vertical wall without interfering with the movement of the can.

FIGS. 10D and 10E show a side view of an embodiment of a chute illustrating movement of the can.

FIGS. 10F and 10G show a top view of a can and an embodiment of a chute illustrating movement of the can.

FIG. 15 is a side view of an embodiment of a chute.

FIG. 16 is a side view of an embodiment of a chute.

FIG. 17 is a top view of an embodiment of a chute.

FIG. 18 is a bottom view of an embodiment of a chute.

FIG. 22 is a front view of an embodiment of a chute.

FIG. 23 is a rear view of an embodiment of a chute.

FIG. 33 is a side view of an embodiment of a chute.

FIG. 34 is a side view of an embodiment of a chute.

FIG. 35 is a top view of an embodiment of a chute.

FIG. 36 is a bottom view of an embodiment of a chute.

FIG. 37 is a detail view of a portion of an embodiment of a chute illustrating an embodiment of an angled extending wall portion.

FIG. 38 is a bottom dimensional view of an embodiment of a chute.

FIG. 41 is a detail view of a portion of an embodiment of a chute.

DETAILED DESCRIPTION

Referring generally to the figures, an embodiment of a mechanism for removing a portion of the sidewalls of cans, illustrated as a trimmer assembly 20, is shown. Cans may be formed with a sidewall, a first end closed by a bottom wall, and an open second end. When cans, such as metal cans, are formed, the sidewalls of the cans may have an uneven axially upper edge at the second open end. Therefore, the sidewalls of the cans may be trimmed, for example, by a trimmer assembly 20 to remove the uneven portion, leaving the can with a sidewall with an even upper peripheral edge. The portion of the sidewall that is removed from the can may be dropped into a chute for disposal, e.g., recycled, etc. It may be undesirable for the portion of the sidewall that is removed not to be dropped into the chute, e.g., miss the chute, fall to the floor, become, for example, lodged inside the can, etc. The cans in the trimmer assembly 20 are rotated around their longitudinal axes and revolved around a central axis during the sidewall trimming process. Additionally, the cans are also moved concurrently in a direction parallel with the central axis toward and away from a cutting assembly while being revolved. An embodiment of a chute is provided that includes an angled extending upper wall portion configured such that as each can is revolved around the central axis and moved axially away from the cutting assembly and the trimmed portion of the sidewall of each can is released from the cutting assembly, each trimmed portion is prevented from entering the respective can by the angled extending upper wall portion of the chute.

Figure 1:
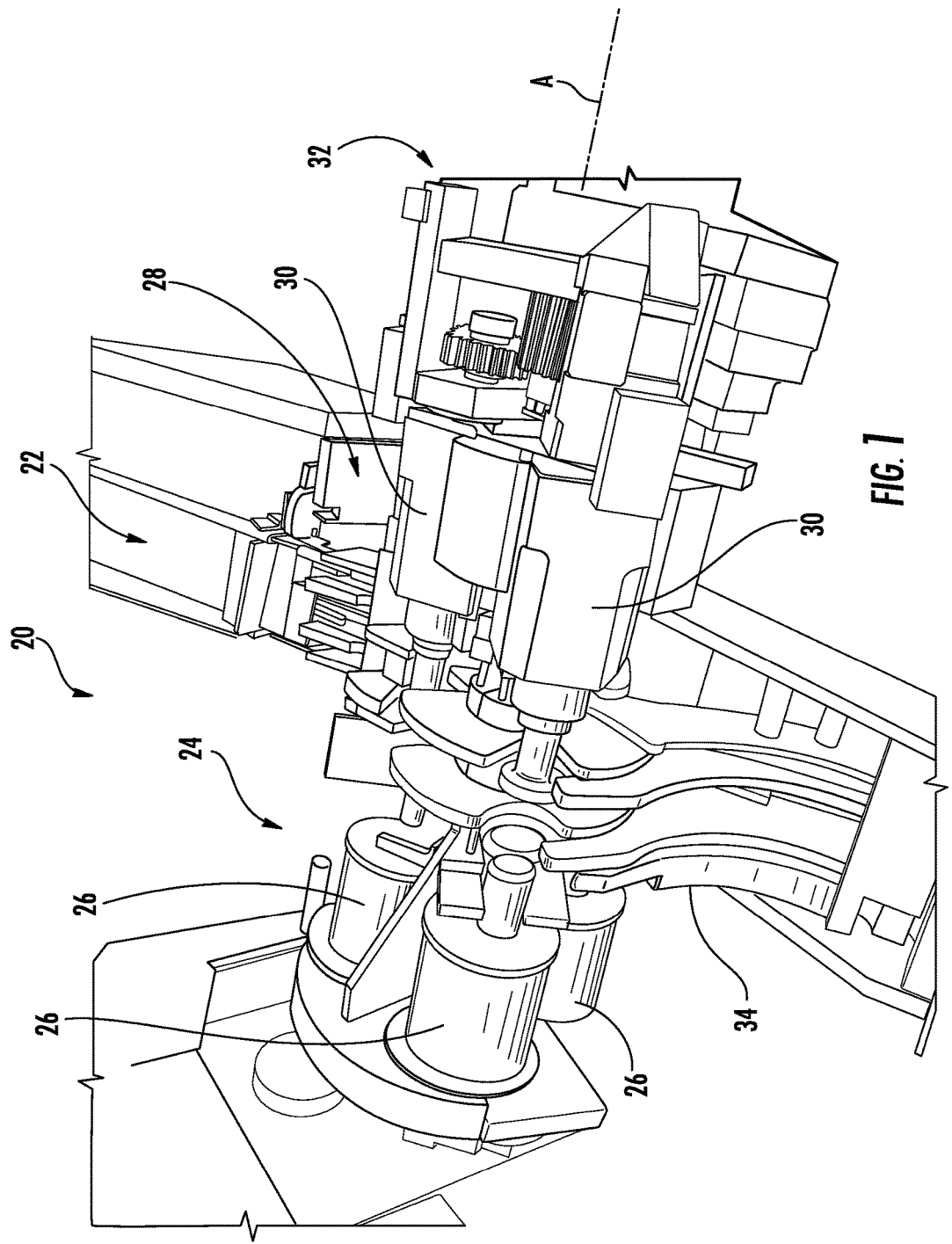
FIG. 1 is a perspective view of an embodiment of a trimmer assembly.

Referring to FIG. 1, an embodiment of a trimmer assembly 20 is illustrated. The trimmer assembly 20 includes a can infeed mechanism 22, a cutting assembly 24 including a plurality of cutting cartridges 26, a can rotation assembly 28 including a plurality of spindle assemblies 30, a positioning cam 32, and a scrap ring chute 34. The can infeed mechanism 22 is configured to deliver cans to be trimmed to the spindle assemblies 30. The spindle assemblies 30 are each configured to revolve the cans around the central axis A, rotate the cans around their longitudinal axes, and move the cans concurrently with the rotation and revolution in a direction parallel with the central axis A toward and away from the cutting cartridges 26. After a portion of the sidewall of each of the cans is removed by the cutting assembly 24, the trimmed portions of the sidewalls are ejected from the cutting assembly 24, dropping into the scrap ring chute 34.

Figure 2:
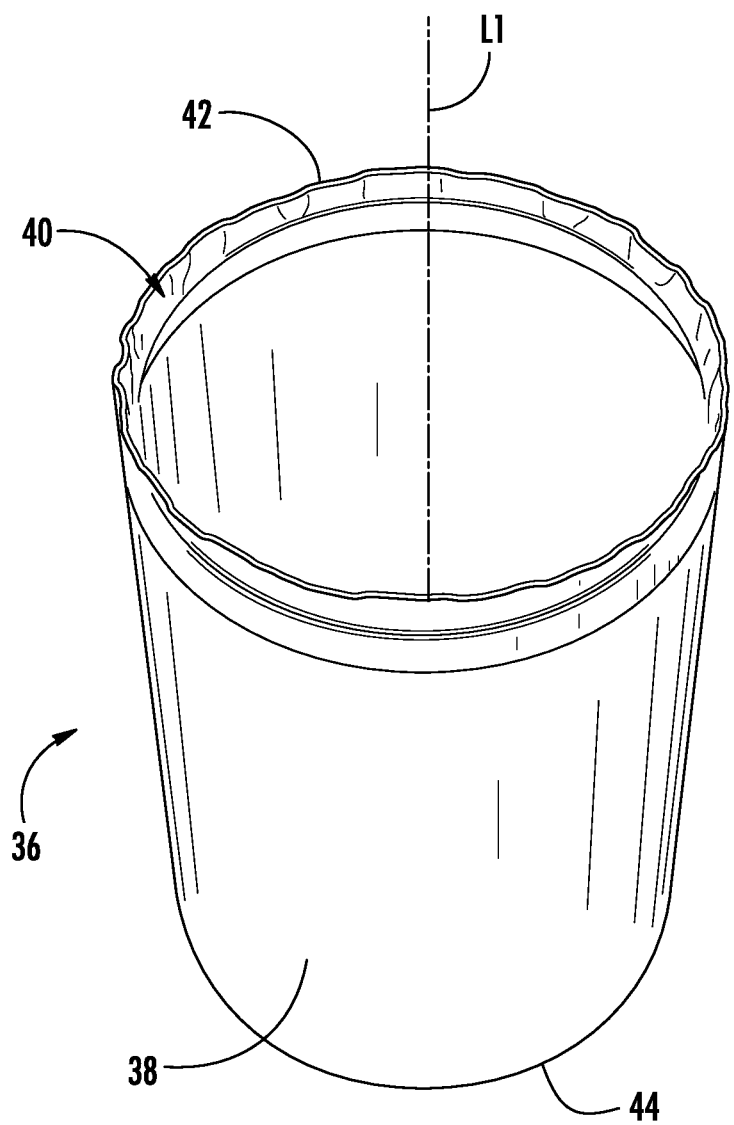
FIG. 2 is a perspective view of an embodiment of a can prior to being trimmed by a trimmer assembly.

With reference to FIG. 2, an exemplary can 36 to be trimmed is illustrated. The can 36 includes a sidewall 38 with an uneven, e.g., varying in height (distance parallel to the longitudinal axis L1 of the can) at the upper axial periphery around the circumference, top portion 40 defining an open top. The sidewall 38 extends from the uneven top peripheral edge 42 to a bottom end 44. In one embodiment, the can 36 is closed at the bottom end 44 of the sidewall 38. The can 36 may be formed, for example, in a draw-redraw process, a draw and iron process, or any other suitable process for forming a can.

Figure 3:
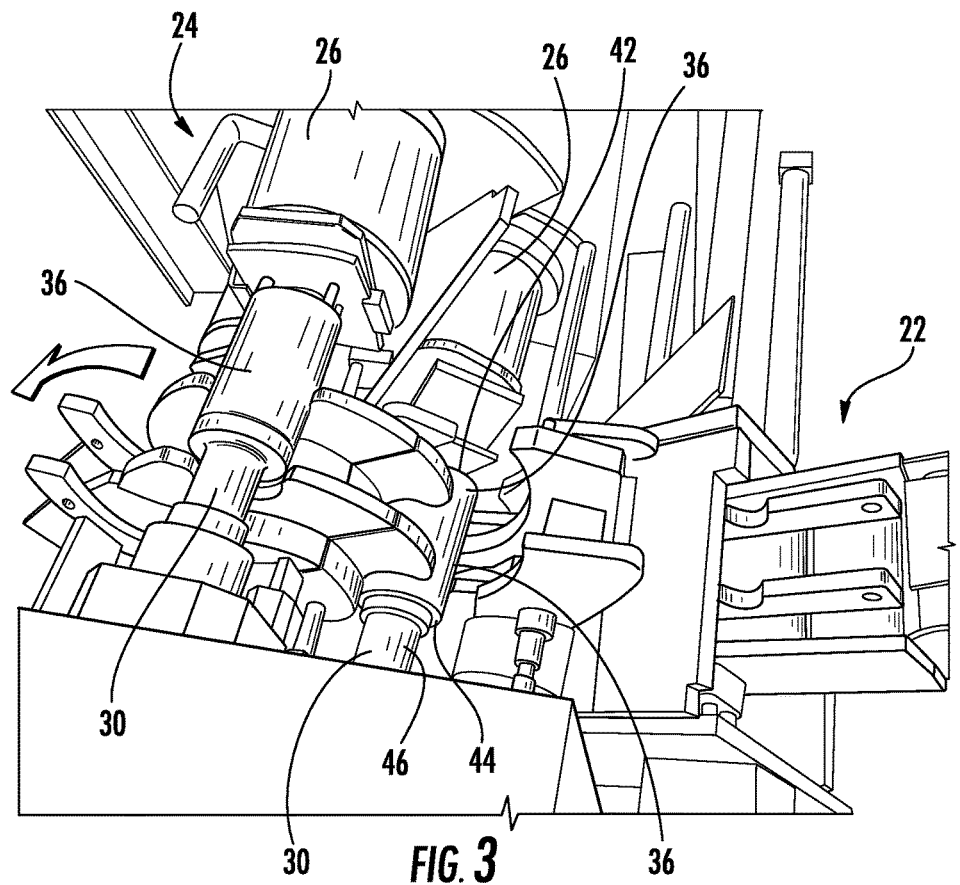
FIG. 3 is a perspective view of an embodiment of an infeed mechanism, a can rotation assembly, and a cutting assembly illustrating movement of cans.
Figure 4:
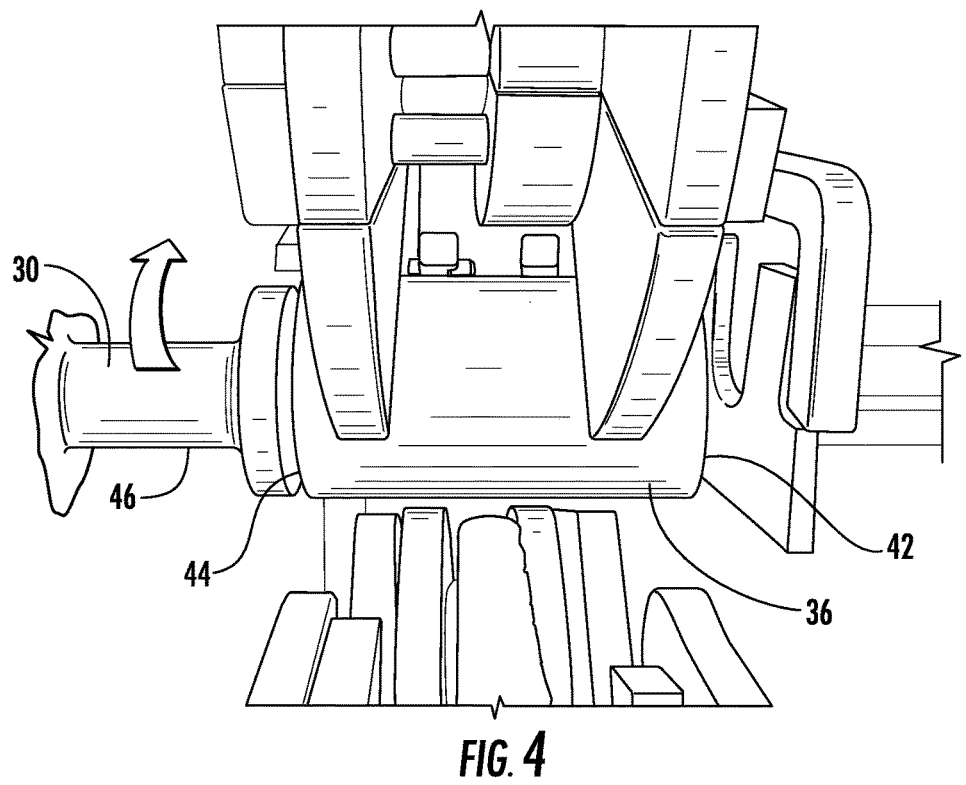
FIG. 4 is a side view of an embodiment of a spindle assembly with a can proximate the infeed mechanism.

With reference to FIGS. 3 and 4, in one embodiment, cans 36 to be trimmed are provided by the can infeed 22 to a vacuum chuck 46 of a spindle assembly 30. The vacuum chuck 46 provides a vacuum that pulls and holds the closed end of the can 36 against the vacuum chuck 46, supporting the can 36 for movement during trimming. The vacuum chuck 46 and the can 36 move in the direction indicated by the arrow in FIGS. 3 and 4, revolving around the central axis A, illustrated in FIG. 1.

Figure 5:
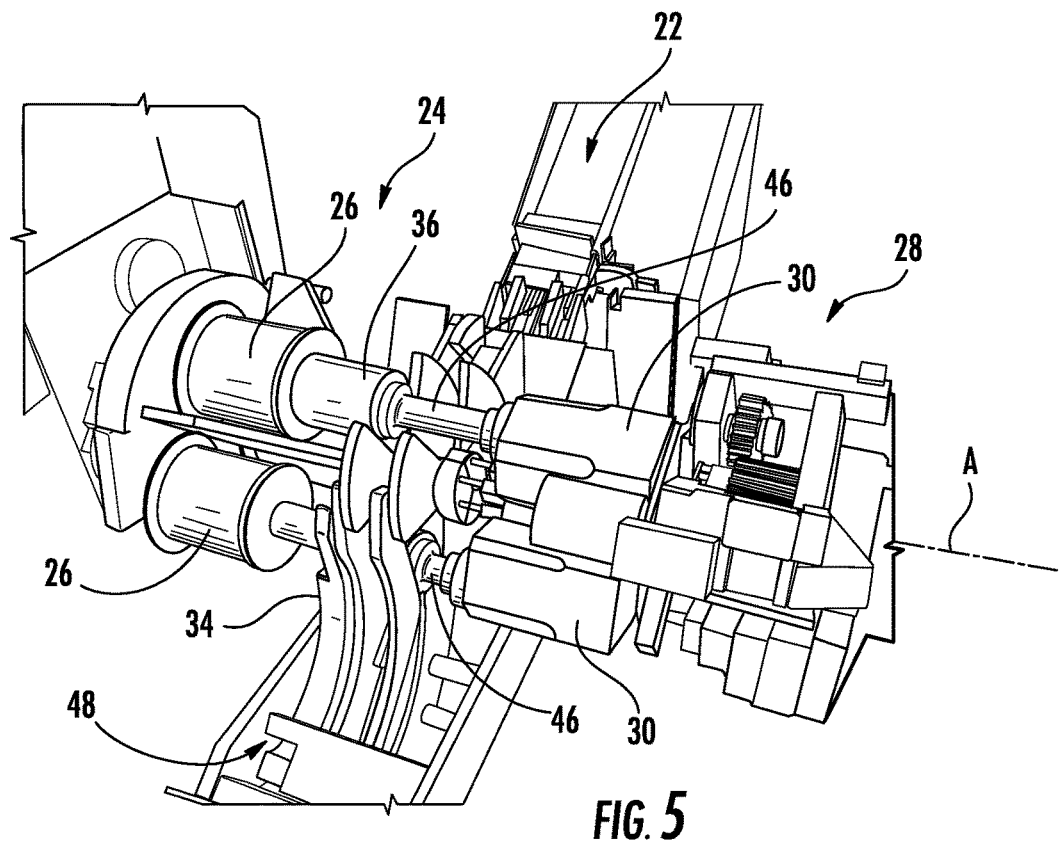
FIG. 5 is a perspective view of an embodiment of a trimmer assembly illustrating a can in an extended configuration toward a cutting cartridge.
Figure 6:
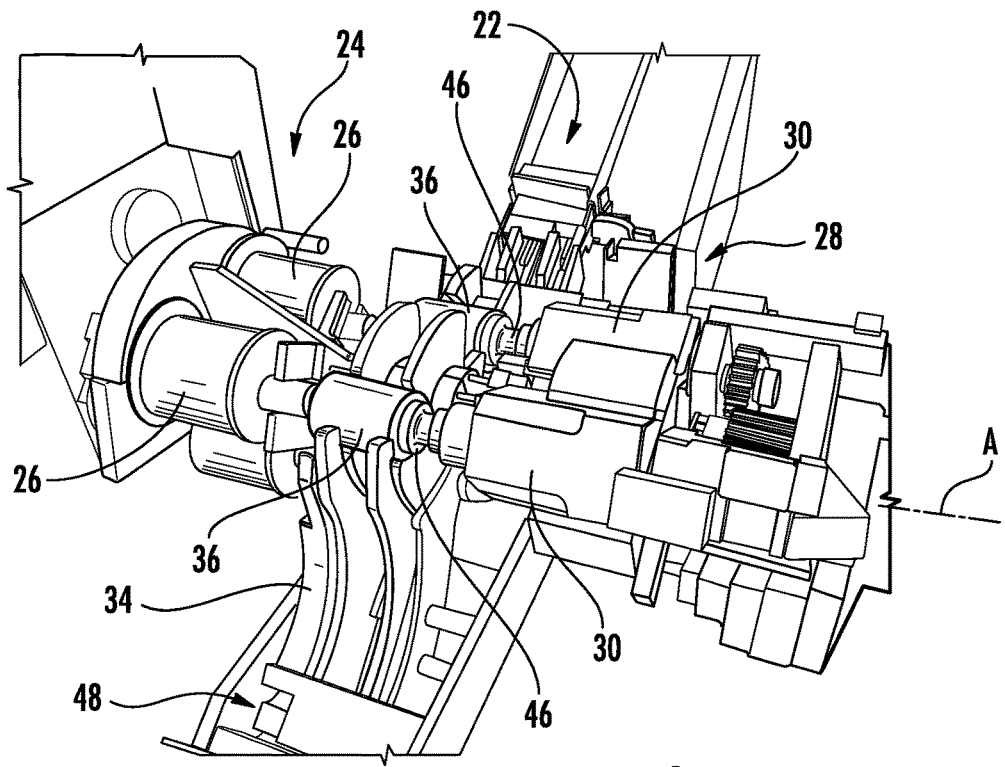
FIG. 6 is a perspective view of an embodiment of a trimmer assembly illustrating a can retracted from the cutting cartridges.

FIGS. 5 and 6 illustrate the cans 36 revolving around the central axis A while the cans 36 are being moved toward and back away from the cutting cartridges 26. In one embodiment, the cans 36 are revolved approximately 55 degrees around the central axis A from the can infeed 22 to the initial cutting position. The cans 36 are then revolved approximately 110 degrees around the central axis A as the cans 36 are trimmed. The cans 36 are then revolved approximately 55 degrees around the central axis A to the can discharge 48.

As the cans 36 are being trimmed, the cans 36 are revolved around the central axis A as well as in a direction generally parallel with the central axis A toward and away from the cutting cartridges. The cans 36 are moved concurrently with the revolution in a direction generally parallel with the axis A toward the cutting cartridges 26 for a first portion of the trimming and then are moved concurrently with the revolution in a direction generally parallel with the axis A back away from the cutting cartridges 26 for a second portion of the trimming.

FIG. 5 illustrates a can 36 located at approximately the top of its rotation about the axis with the vacuum chuck 46 extended such that the can 36 has been moved toward the cutting cartridge 26. FIG. 6 illustrates a can proximate the chute 34 with the vacuum chuck 46 having been retracted such that the can 36 has been moved away from the cutting cartridge 26. Thus, the can 36 follows an arched path during the cutting process upwardly in a direction away from the can infeed 22 around the axis A and toward the cutting cartridge 26 and then downwardly around the axis A and away from the cutting cartridge 26 toward the can discharge 48.

Figure 7:
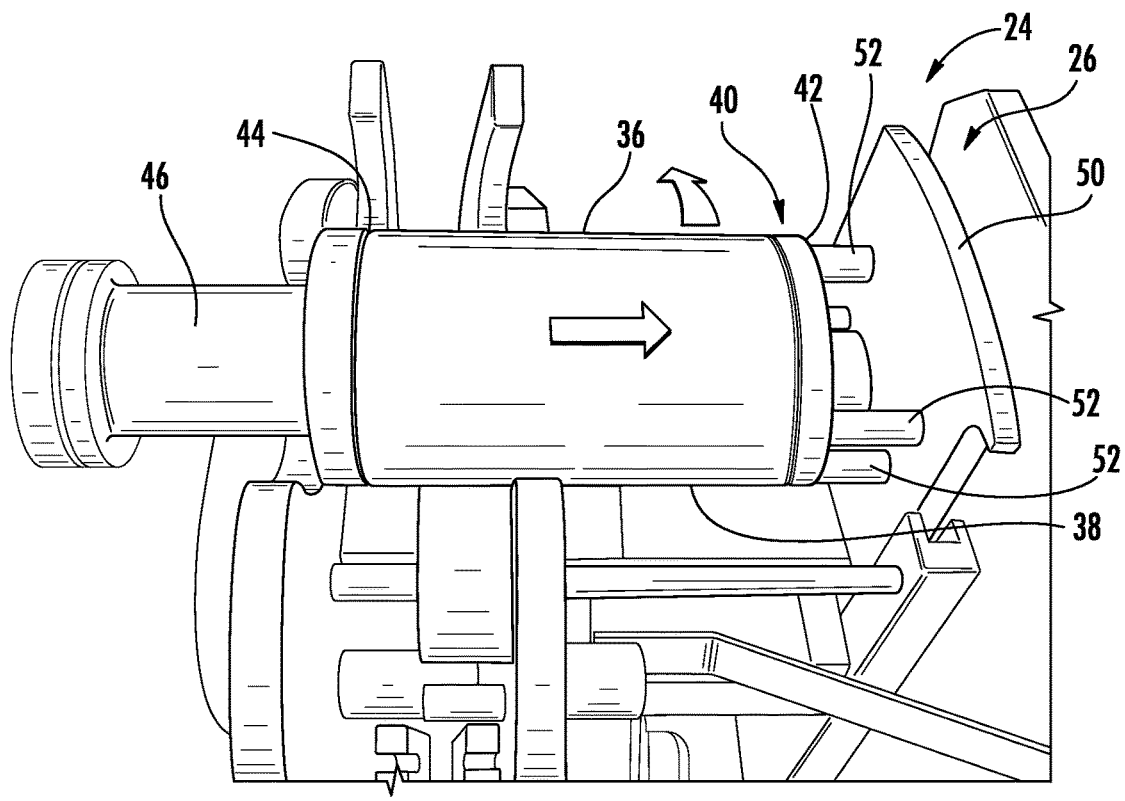
FIG. 7 is a detail view of a can illustrating revolving movement of the can and movement toward the cutting cartridge.
Figure 8:
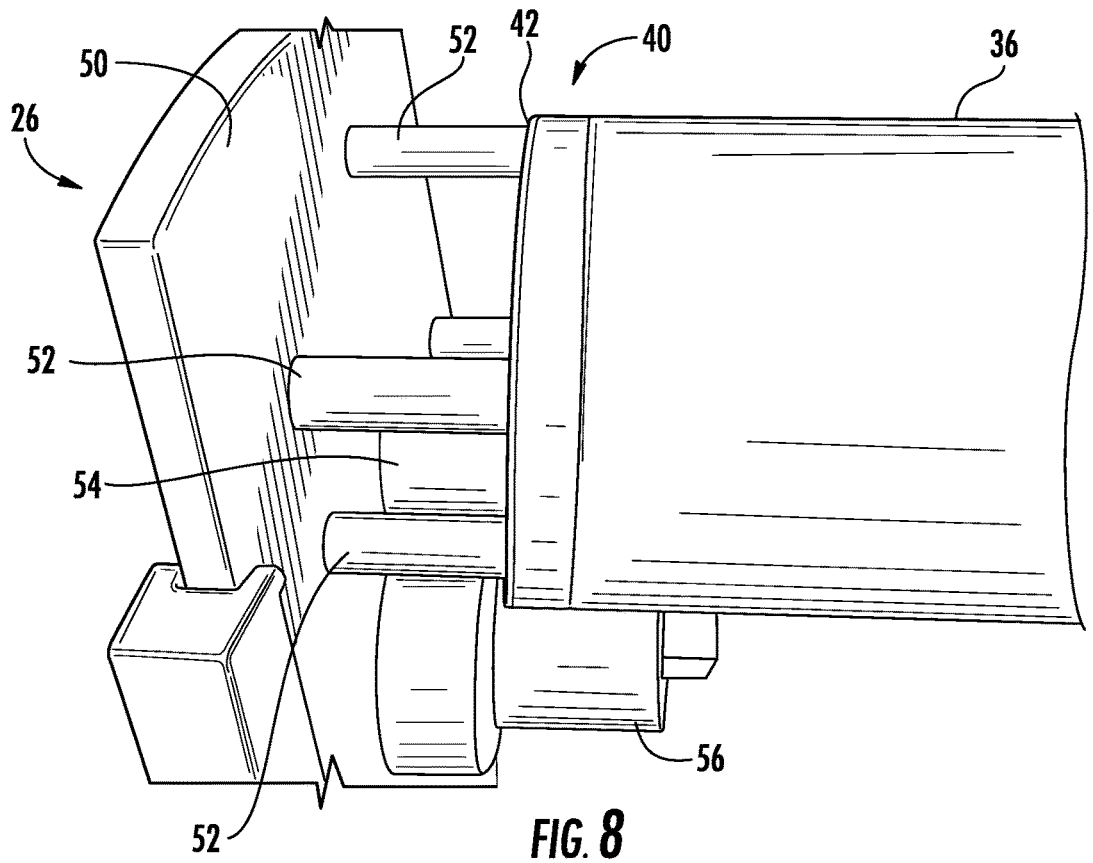
FIG. 8 is a detail view of a can and a stripper plate and stripper pins of a cutting cartridge.

With reference to FIGS. 7, 7A, and 8, an embodiment of the trimming process is further described. A plate, illustrated as a stripper plate 50, is provided. The plate 50 includes several apertures through which pins, illustrated as stripper pins 52, may pass. In the illustrated embodiment, six pins 52 are provided. In other embodiments, other suitable numbers of pins may be provided. The plate 50 is configured to move concurrently with the vacuum chuck 46 generally parallel with the central axis A.

In one embodiment, as the can 36 is moved toward the cutting cartridge 26 to locate the pins 52 in the interior of the can 36 and provide support for the sidewall 38 of the can 36 as the sidewall 38 is trimmed. As the can 36 is moved toward the cutting cartridge 26, the stripper plate 50 moves in the same direction as the can 36 away from the can 36 exposing the stripper pins 52. An upper cutter 54 and a lower cutter 56 are provided. The sidewall 38 of the can 36 is inserted between the upper cutter 54 and the lower cutter 56, with the upper cutter 54 being located in the can 36 and the lower cutter 56 being located outside of the can. As the can 36 is rotated about its longitudinal axis, the cutters 54 and 56 cut through the sidewall 38 of the can 36 to remove an axially upper portion of the sidewall 38 of the can 36.

Figure 9:
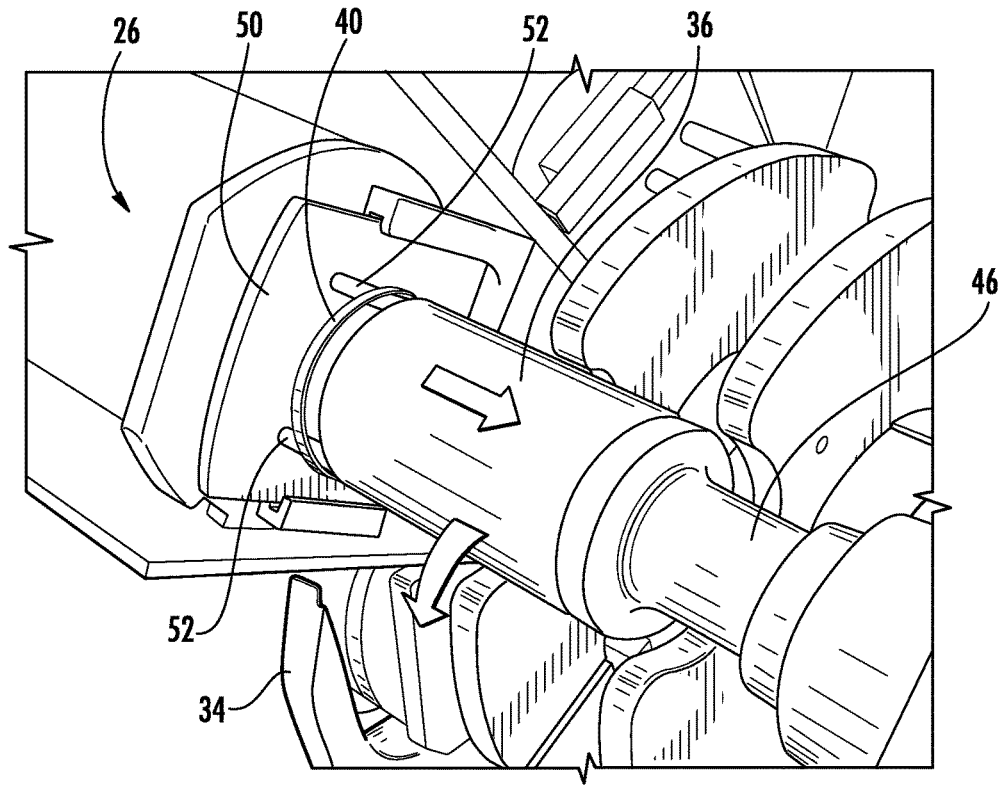
FIG. 9 is a perspective view illustrating a can being revolved and moved away from the stripper plate with a removed portion of the sidewall of the can separating from the can on the stripper pins.

With reference to FIG. 9, in one embodiment, once the can 36 has been rotated at least 360°, the uneven top portion 40 will have been cut from the sidewall 38 by the cutters 54 and 56. As the revolution of the can 36 around the central axis A (see FIG. 1) continues, the can 36 is moved away from the cutting cartridge 26. As the vacuum chuck 46 moves away from the cutting cartridge 26, the stripper plate 50 moves toward the can 36 along the stripper pins 52 pushing the removed uneven top portion 40 along the stripper pins 52.

Figure 10:
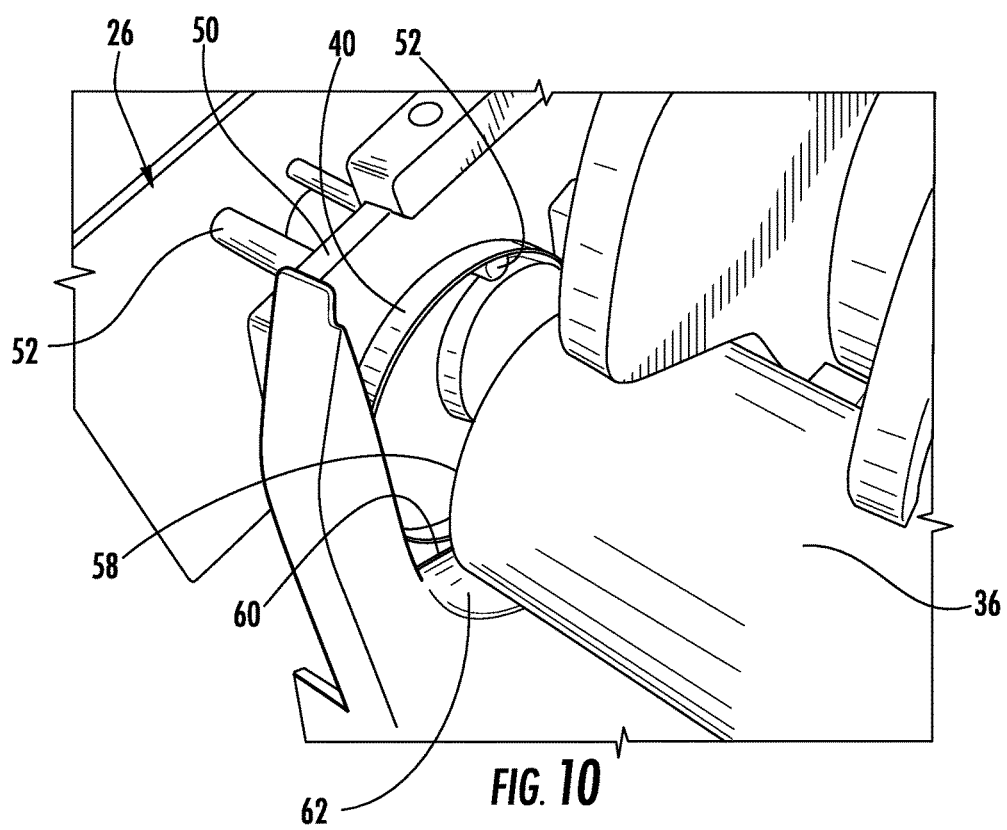
FIG. 10 is a detail view of a can moving past an angled extending wall of an embodiment of a chute and the removed portion of the sidewall of the can being moved to the ends of the stripper pins by the stripper plate.

With reference to FIG. 10, in one embodiment, as the can 36 is rotated around the central axis A and moved away from the cutting cartridge 26, the new axial peripheral edge 58, e.g., the axial periphery of the sidewall after the uneven top portion 40 has been removed, will follow a path past the upper peripheral edge 60 of the angled extending wall 62 of the scrap ring chute 34. Movement of the can 36 and the angle of the angled extending wall 62 are matched such that the new axial peripheral edge 58 of the can 36 passes within between approximately 0.01 inches and approximately 1 inch of the upper peripheral edge 60 of the angled extending wall 62 of the scrap ring chute 34. In another embodiment, the new axial peripheral edge 58 of the can 36 passes within between approximately 0.02 inches and 0.04 inches of the upper peripheral edge 60 of the angled extending wall 62 of the scrap ring chute 34.

With further reference to FIG. 10, in one embodiment, the uneven top portion 40 is moved to the end of the stripper pins 52 and pushed off by the stripper plate 50. The uneven top portion 40 typically falls into the scrap ring chute 34 after being removed from the stripper pins 52. However, due to various factors, e.g., stripper pins 52 exerting radially outwardly directed force, for example uneven force, on the uneven top portion 40, deformation of the uneven top portion 40 causing pressure, etc., in some cases the uneven top portion 40 may be propelled unpredictably off of the stripper pins 52. In some trimmer assemblies, brushes and other displaceable obstructions, displaceable by can movement, but being located, e.g., moving, into place between the can and the uneven top portion 40 after the can has passed to prevent uneven top portion 40 from being propelled into the can, may be provided. However, these may require frequent replacement. Such replacement may require trimmer assembly down time, which may be undesirable. The angled extending wall 62 of the scrap ring chute 34 does not interfere with the movement of cans 36, e.g., is configured not to contact cans, but prevents the removed uneven top portion 40 from moving past the scrap ring chute 34, e.g., into the interior of the can 36.

In one embodiment, the angle of the angled extending wall 62 allows the upper peripheral edge 60 of the wall 62 to be located higher than a non-angled wall without interfering with the movement of the can 36. With reference to FIGS. 10B and 10C, a chute 34 with an angled extending wall 62 can have a higher upper peripheral edge 60 without interfering with the movement of the can 36, e.g., contacting the sidewall 38 of the can 36 than a chute 34' with a vertical wall without an angled extending wall with an upper peripheral edge 60'. If the vertical wall were made with the upper peripheral edge 60' at the same height relative to the can 36' as the upper peripheral edge 60 of the angled extending wall 62, the sidewall 38' of the can 36' would contact the upper peripheral edge 60' of the vertical wall of the chute 34'.

FIGS. 10D and 10E show a side view illustrating movement of the can 36 relative to the chute 34 and the angled extending wall 62. The angled extending wall 62 is configured to match the movement of the can 36, e.g., the can 36 moves so that the new axial peripheral edge 58 of the sidewall 38 passes in close proximity with but does not contact the angled extending wall 62.

FIGS. 10F and 10G show a top view illustrating movement of the can 36 relative to the chute 34 and the angled extending wall 62. As the can 36 is revolved around the axis A (see FIG. 1), it is also moved away from the chute 34 in a direction generally parallel to the axis A. The angled extending wall 62 is configured such that it extends upwardly and over a portion of the opening of the chute 34. The angled extending wall 62 is configured to prevent the removed portion 40 of the sidewall 38 of the can 36 from moving past the chute 34 without the angled extending wall interfering with the movement of the can 36, e.g., without the sidewall 38 of the can 36 contacting the upper peripheral edge 60 or the angled extending wall 62.

In one embodiment, a vacuum source is provided. The vacuum source is configured to draw a vacuum through the chute 34 tending to draw removed portions of sidewalls of cans down into the chute 34. In one embodiment, a sensor is provided. The sensor is configured to detect whether a removed portion of a sidewall of a can has passed through the chute 34. If the sensor does not sense that a removed portion of a sidewall of a can has passed through the chute 34 after the portion of the sidewall has been removed from the can, then the sensor can indicate this, e.g., signal a controller, indicator, etc., that a sidewall portion has not been detected passing through the chute 34. When the sensor indicates that a removed portion has not passed through the chute 34, action can be taken, e.g., to stop the trimmer assembly 20, verify that the removed sidewall portion did not become lodged in the can, locate the removed sidewall portion etc. In one embodiment, a controller is provided coupled to a sensor. The sensor is configured to detect when a removed portion of the sidewall of a can passes through the chute 34. In one embodiment, the controller may include a processor, such as a microprocessor. In other embodiments, the controller may be any suitable type of controller. The controller detects when a portion of a sidewall is removed from a can, e.g., detects actual removal of the portion of the sidewall, the location of the can rotation assembly, spindle assembly, or the positioning cam, etc. If the sensor does not sense a removed portion of a sidewall of a can passing through the chute following detection of removal of a portion of a sidewall, the controller may be configured to indicate that a removed portion of a sidewall of a can was not detected and, for example, the trimmer assembly can be stopped, the removed portion of the sidewall can be located, etc. In another embodiment, the controller is configured with a timer such that, if the sensor does not sense a removed portion of a sidewall of a can within the time period in which a removed portion of the can is expected, the controller may be configured to indicate that a removed portion of a sidewall of a can was not detected and, for example, the trimmer assembly can be stopped, the removed portion of the sidewall can be located, etc. In other embodiments, any other suitable sensor and/or controller arrangement may be used to determine if a portion of a sidewall of a can has been removed but has not passed through the chute.

With reference to FIGS. 11-18, an embodiment of a scrap ring chute 134 is illustrated. The scrap ring chute 134 includes a front wall 136, a rear wall 142 spaced apart from the front wall 136, and a pair of sidewalls 138 and 140 extending between the front wall 136 and the rear wall 142. The walls 136, 138, 140, and 142 define a central opening 143 to a passage through which the portion of each can that is removed from the sidewall, e.g., the scrap ring, travels through away from the cutting assembly 24. The front wall 136, e.g., the wall distal from the cutting assembly 24 illustrated in FIG. 1, includes an upper portion 144 (see FIGS. 13 and 15) that extends along a first plane P1 and a lower portion 145 that extends curving away from the first plane P1 (see FIGS. 13, 15, and 17).

In one embodiment, extending from the upper end of the upper portion 144 is an extended portion, shown as an angled extending wall 146. The angled extending wall 146 extends non-parallel to the first plane P1 from the upper portion 144 to the upper peripheral edge 148. The angled extending wall 146 extends angularly in a direction away from the upper portion 144. The angled extending wall 146 is located vertically above, e.g., overhanging, covering, etc., at least a portion of the central opening 143, with the upper peripheral edge 148 located above the central opening 143 between the front wall 136 and the rear wall 142.

Figures 11, 12:
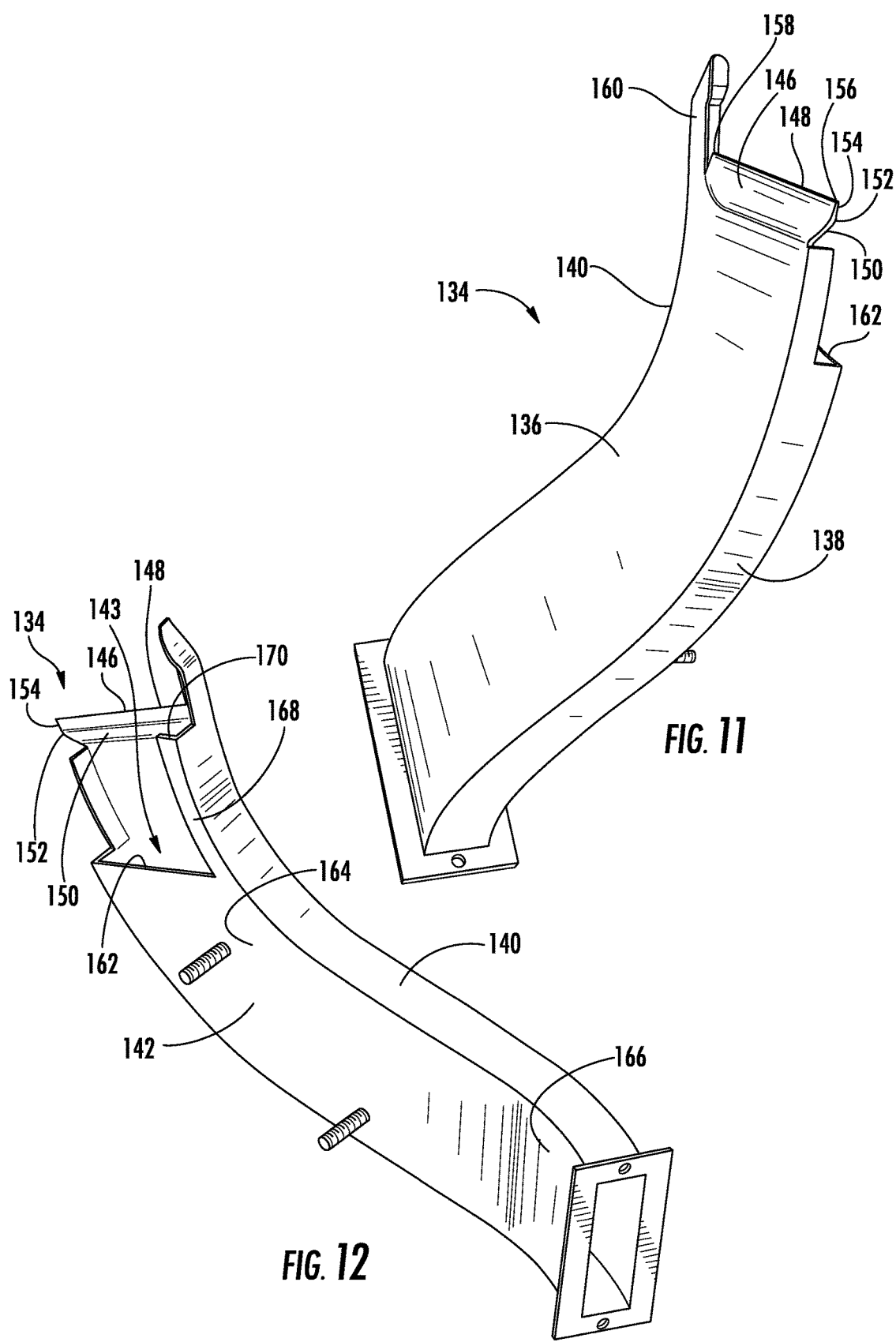
FIG. 11 is a front perspective view of an embodiment of a chute.
FIG. 12 is a rear perspective view of an embodiment of a chute.
Figure 14:
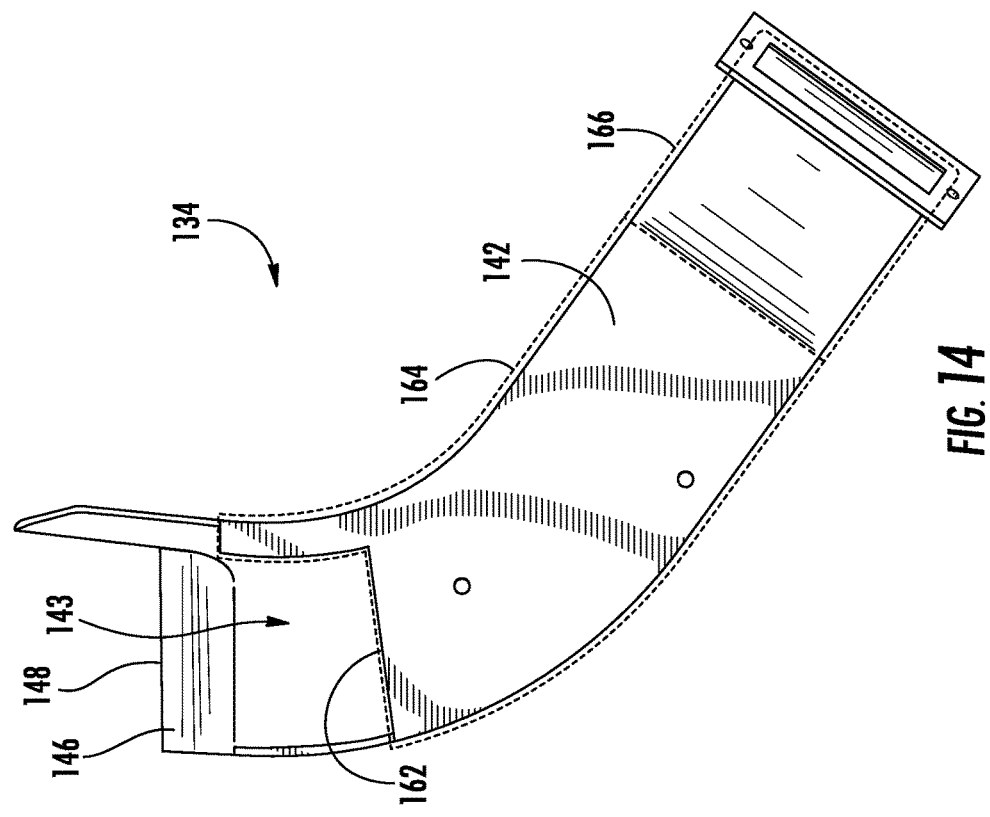
FIG. 14 is a rear view of an embodiment of a chute.
Figure 13:
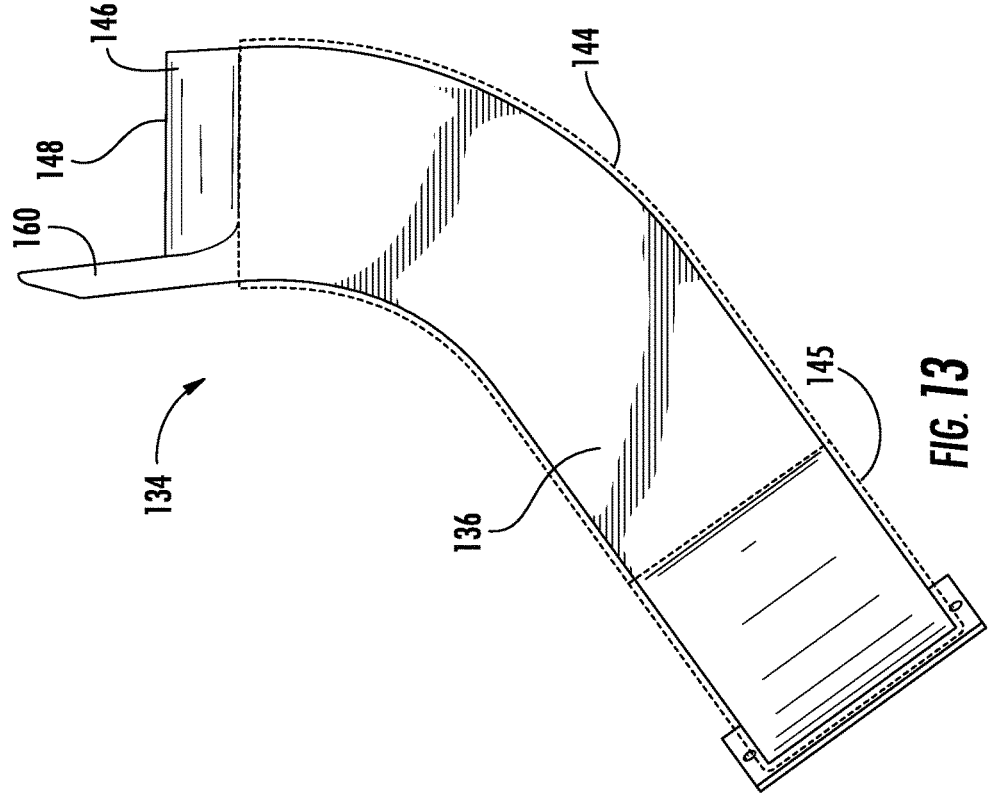
FIG. 13 is a front view of an embodiment of a chute.

As is illustrated in FIGS. 11 and 16, the angled extending wall 146 includes a first angular portion 150 extending from the upper portion 144 of the front wall 136 to a junction 152 and a second angular portion 154 extending from the junction 152 to the upper peripheral edge 148. The second angular portion 154 extends non-parallel to the first angular portion 150. The first angular portion 150 extends at an angle θA relative to the upper portion 144 of the front wall 136 and the plane P1.

In one embodiment, the angle θA is between approximately 1° and 45°. In another embodiment, the angle θA is between approximately 15° and 30°. In another embodiment, the angle θA is approximately 25°. In another embodiment, the angle θA is selected based on the movement of the cans by the trimmer apparatus such that the trimmed can passes within between approximately 0.01 inches and approximately 0.2 inches of the upper peripheral edge 148 of the front wall 136 and to continue past the angled extending wall 146 within between approximately 0.02 inches and approximately 0.2 inches. In another embodiment, the angle θA is selected based on the movement of the cans by the trimmer apparatus such that the trimmed can passes within between approximately 0.02 inches and approximately 0.04 inches of the upper peripheral edge 148 of the front wall 136 and to continue past the angled extending wall 146 within between approximately 0.02 inches and approximately 0.04 inches.

With further reference to FIG. 11, in the illustrated embodiment, the upper peripheral edge 148 of the angled extending wall 146 extends generally linearly from a first end 156 proximate the first sidewall 138 to a second end 158. The front wall 136 also includes a vertical extension portion 160 extending between the second sidewall 140 and the second end 158 of the upper peripheral edge 148 of the angled extending wall 146. The vertical extension portion 160 extends generally along the plane P1 parallel with the upper portion 144 of the front wall 136.

The rear wall 142 is spaced apart from the front wall 136 and extends from an upper peripheral edge 162 downwardly. The rear wall 142 includes an upper portion 164 that extends along a second plane P2 generally parallel to the first plane P1 and a lower portion 166. The upper portion 164 of the rear wall 142 curves along the second plane P2 from the upper peripheral edge 162 generally in a direction away from the can infeed 22 (see FIG. 1) to the lower portion 166. The lower portion 166 extends non-parallel to the upper portion 164 curving out of the plane P2 generally in the direction of the cutting assembly 24. Thus, the passage defined by the chute 134 follows a path first curving away from the can infeed 22 and downwardly and then curving generally downwardly in the direction of the cutting assembly 24.

The upper peripheral edge 162 of the rear wall 142 is located lower than the upper peripheral edge 148 of the angled extending wall 146 and the upper periphery of the upper portion 144 of the front wall 136. The rear wall 142 also includes a side extension portion 168 extending upwardly proximate the sidewall 140. The side extension portion 168 extends upwardly to an upper peripheral edge 170 of the side extension portion 168. The upper peripheral edge 170 is located at approximately the same height as the upper periphery of the upper portion 144 of the front wall 136, but lower than the upper peripheral edge 148 of the angled extending wall 146. The sidewall 138 extends to a first height proximate the rear wall 142 generally the same as the height of the upper peripheral edge 162 of the rear wall 142. The sidewall 138 extends to a second height proximate the front wall 136 generally the same as the height of the upper periphery of the upper portion 144 of the front wall 136. The illustrated embodiment of the chute 134 is shaped and configured to receive removed portions of sidewalls of containers through the central opening 143 into the chute 134 and to prevent the removed portions of sidewalls of containers from moving past the chute 134 without entering he central opening 143.

With reference to FIGS. 19-27, another embodiment of a chute, illustrated as scrap ring chute 234, is shown. The passage defined by the chute 234 generally follows a similar path to the chute 134, e.g., first curving away from the can infeed 22 and downwardly and then curving generally downwardly in the direction of the cutting assembly 24. Differences in the shape of the upper portion of the chute 234 from the chute 134 are the focus of the description below.

In the illustrated embodiment, the front wall 236 of the chute 234 includes an upper portion 244 and a lower portion 245. The upper portion 244 extends to an upper periphery 247 that extends generally linearly from one sidewall 238 to the other 240. Extending angularly from the upper periphery 247 of the upper portion 244 is an angled extending wall 246. The angled extending wall 246 extends from the upper portion 244 to an upper peripheral edge 248. With reference to FIGS. 22 and 23, in the illustrated embodiment, the upper peripheral edge 248 is generally non-linear and extends from a highest point 249 proximate the sidewall 240 sloping downwardly to a lowest point 251 between the sidewalls 238 and 240, to a local high point 253 lower than the highest point 249, and slopes downwardly toward the sidewall 238. As in the previous embodiment, the angled extending wall 246 extends away from the upper portion 244 such that the upper peripheral edge 248 is located over the central opening 243 between the front wall 236 and the rear wall 242. In one embodiment, the angled extending wall 246 is angled to match the path of trimmed cans being revolved and moved away from the cutting assembly 24 such that the angular extending wall 246 prevents trimmed portions of the sidewalls of cans from moving past the scrap ring chute 234 without entering the scrap ring chute 234 while not interfering with (e.g., touching) the trimmed cans.

Figure 19:
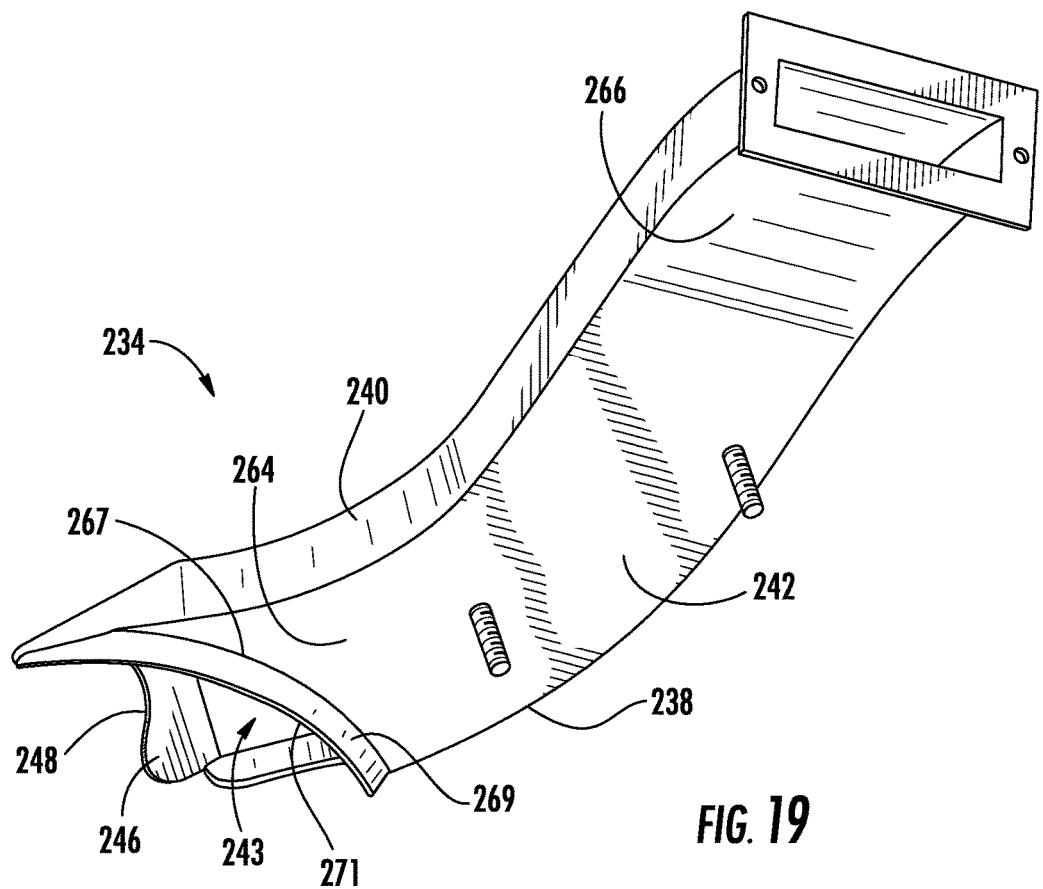
FIG. 19 is a rear perspective view of an embodiment of a chute.
Figure 20:
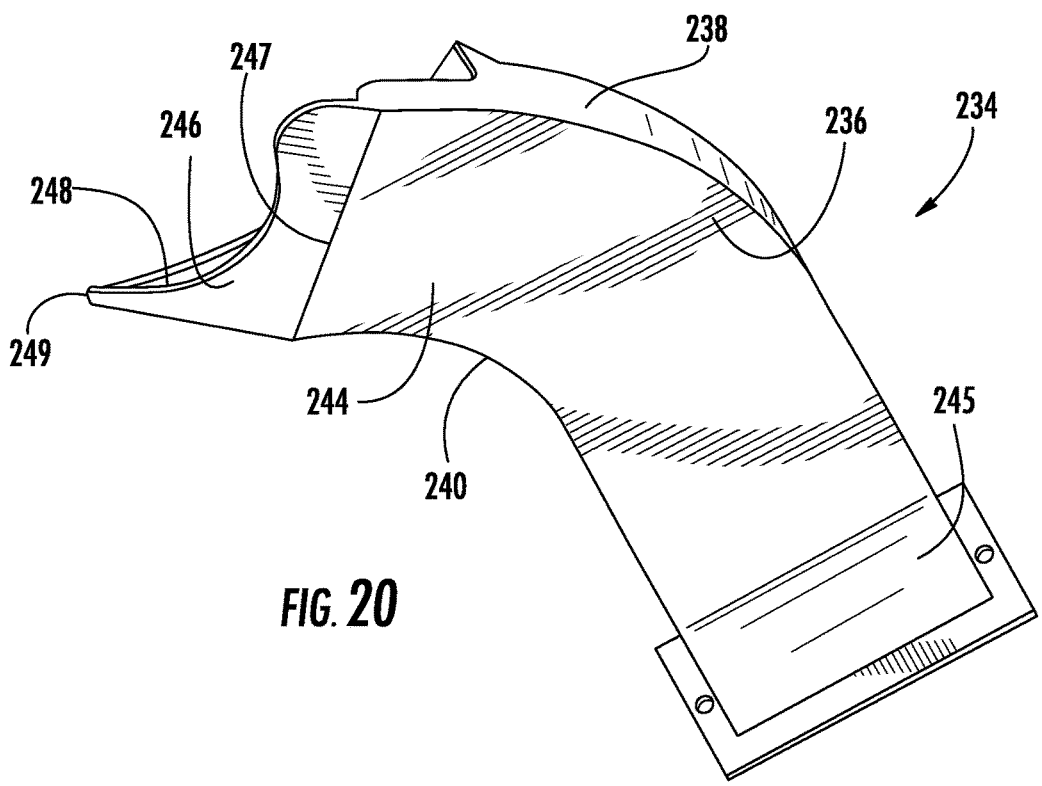
FIG. 20 is a front perspective view of an embodiment of a chute.
Figure 21:
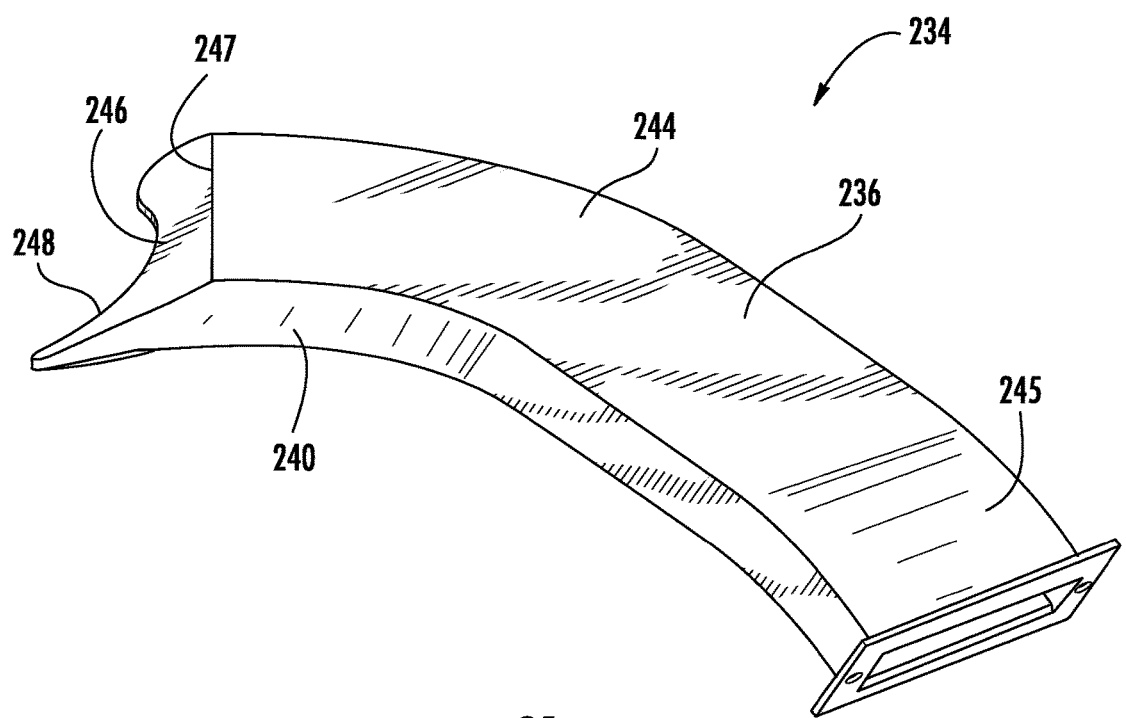
FIG. 21 is a perspective view of an embodiment of a chute.
Figure 24:
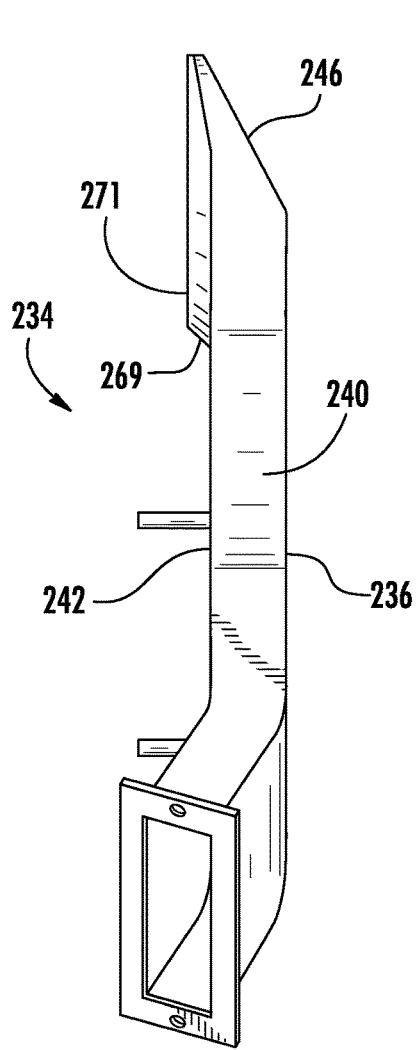
FIG. 24 is a side view of an embodiment of a chute.
Figure 25:
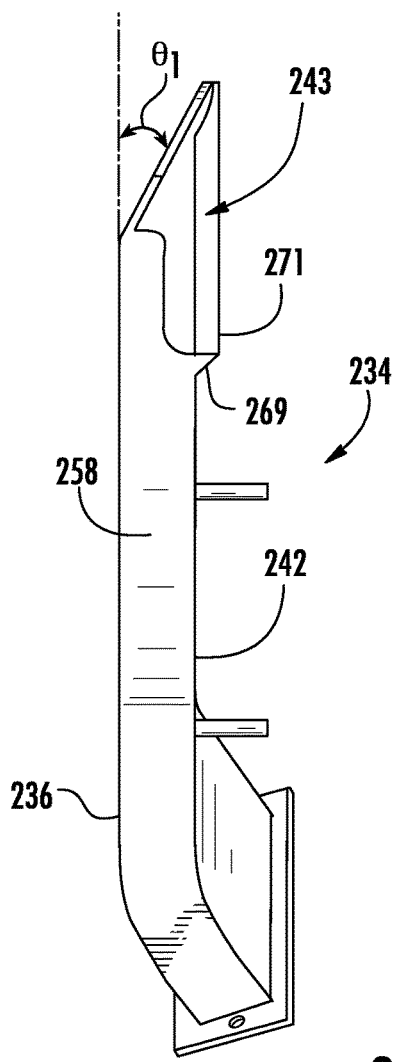
FIG. 25 is a side view of an embodiment of a chute.
Figure 26:
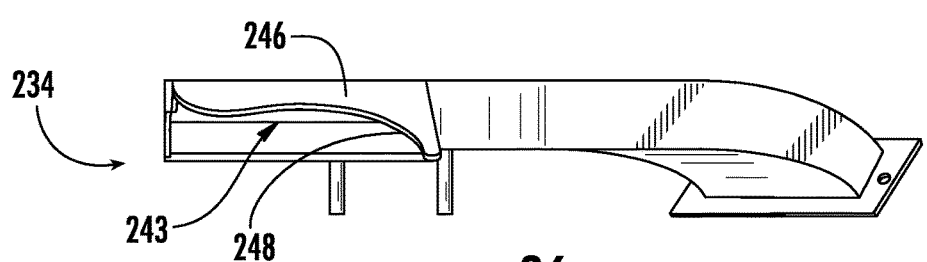
FIG. 26 is a top view of an embodiment of a chute.
Figure 27:
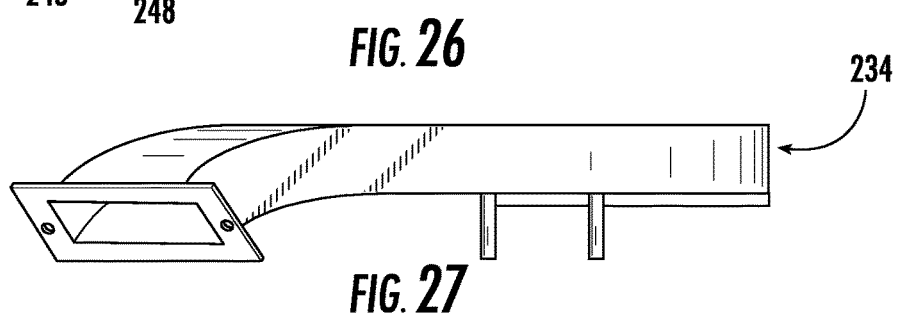
FIG. 27 is a bottom view of an embodiment of a chute.
Figure 28:
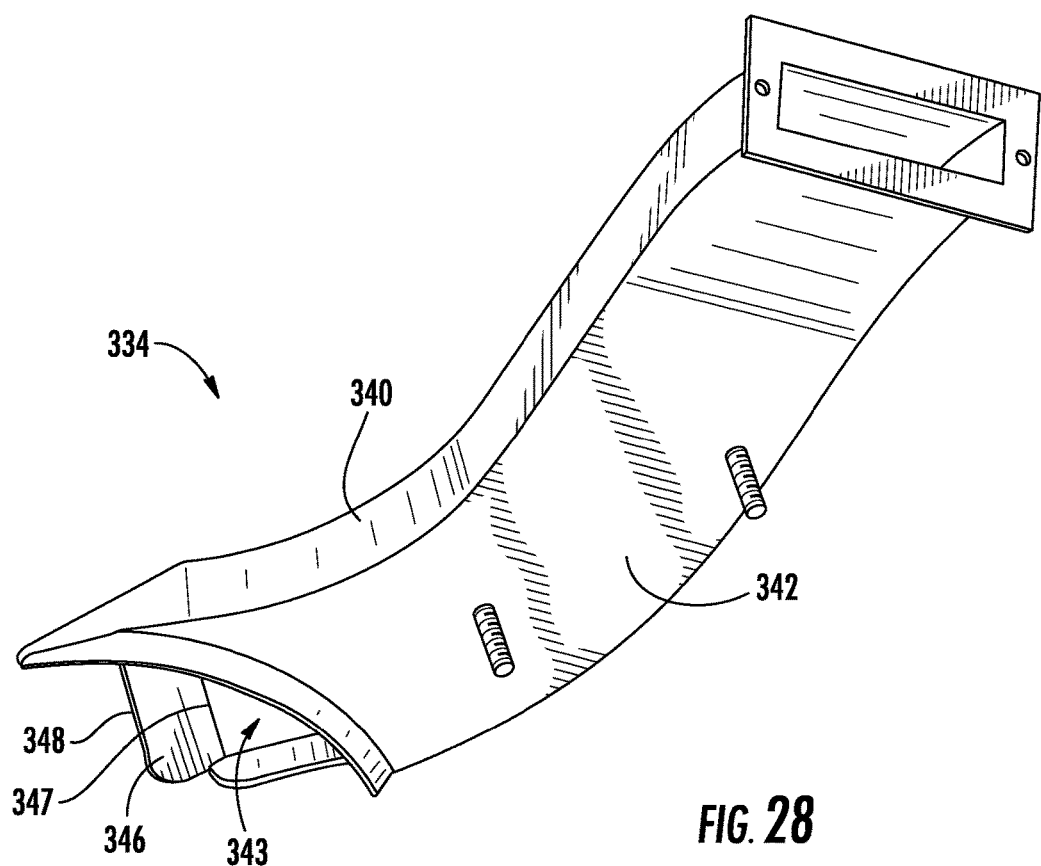
FIG. 28 is a rear perspective view of an embodiment of a chute.
Figure 29:
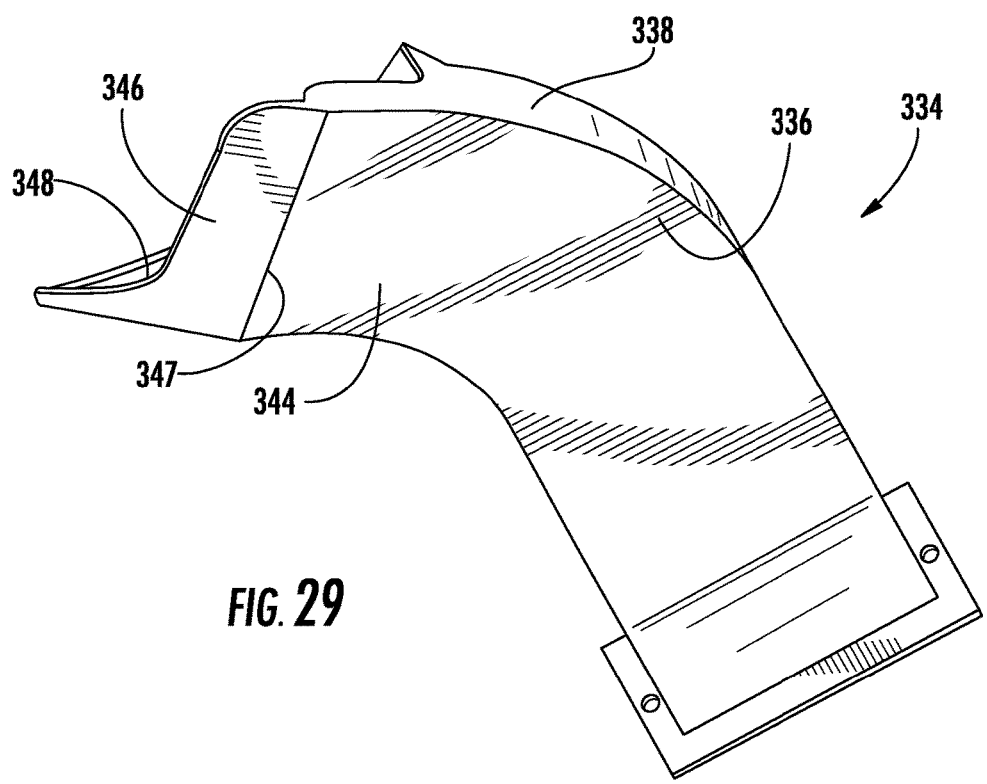
FIG. 29 is a front perspective view of an embodiment of a chute.
Figure 30:
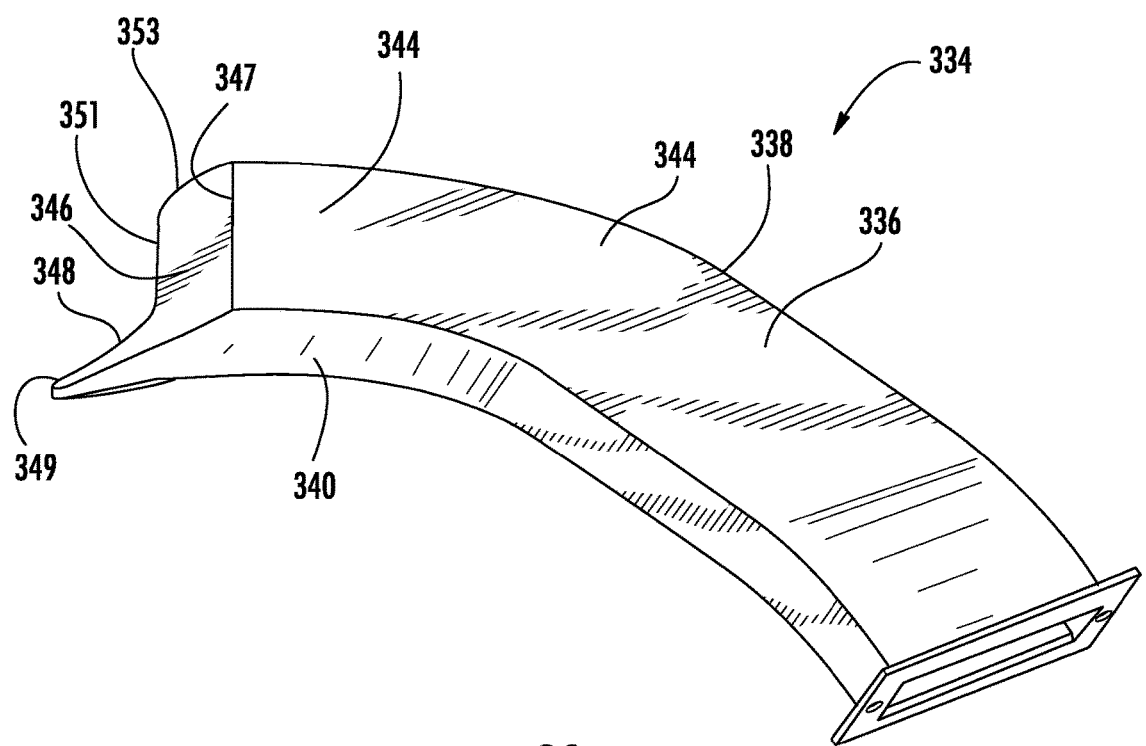
FIG. 30 is a perspective view of an embodiment of a chute.
Figure 32:
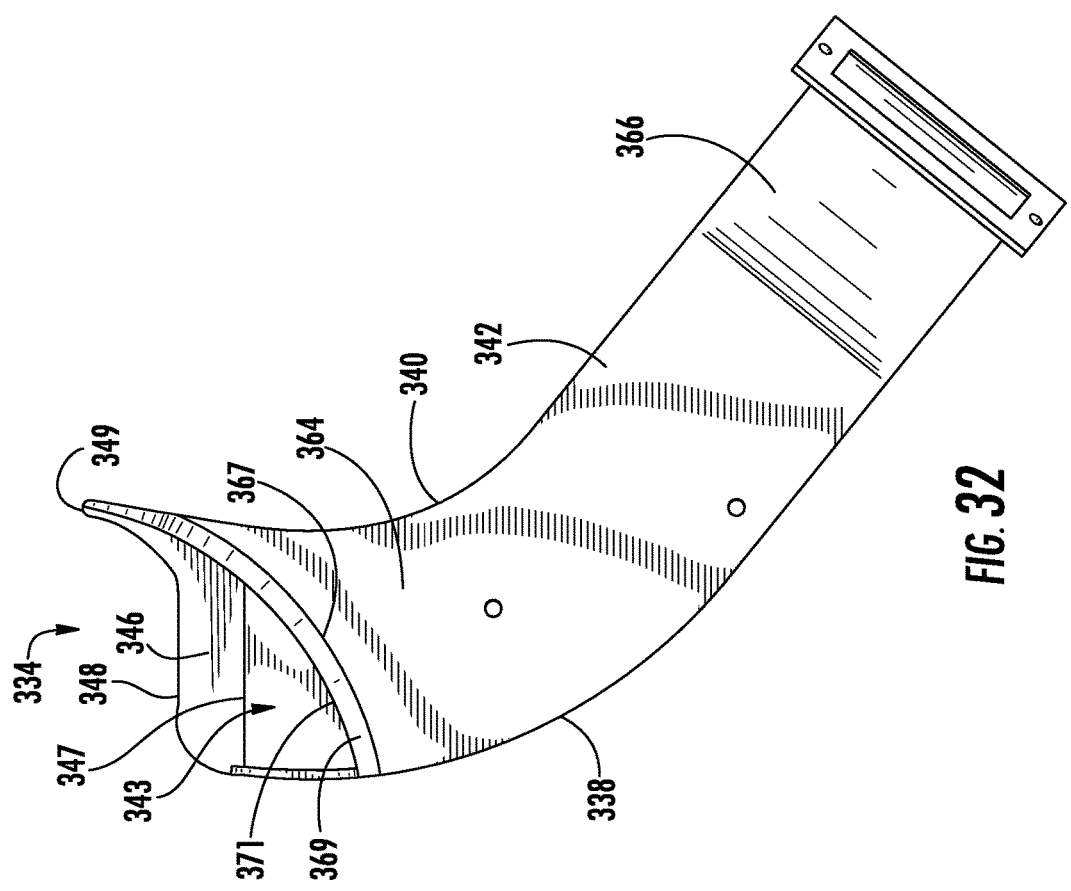
FIG. 32 is a rear view of an embodiment of a chute.
Figure 31:
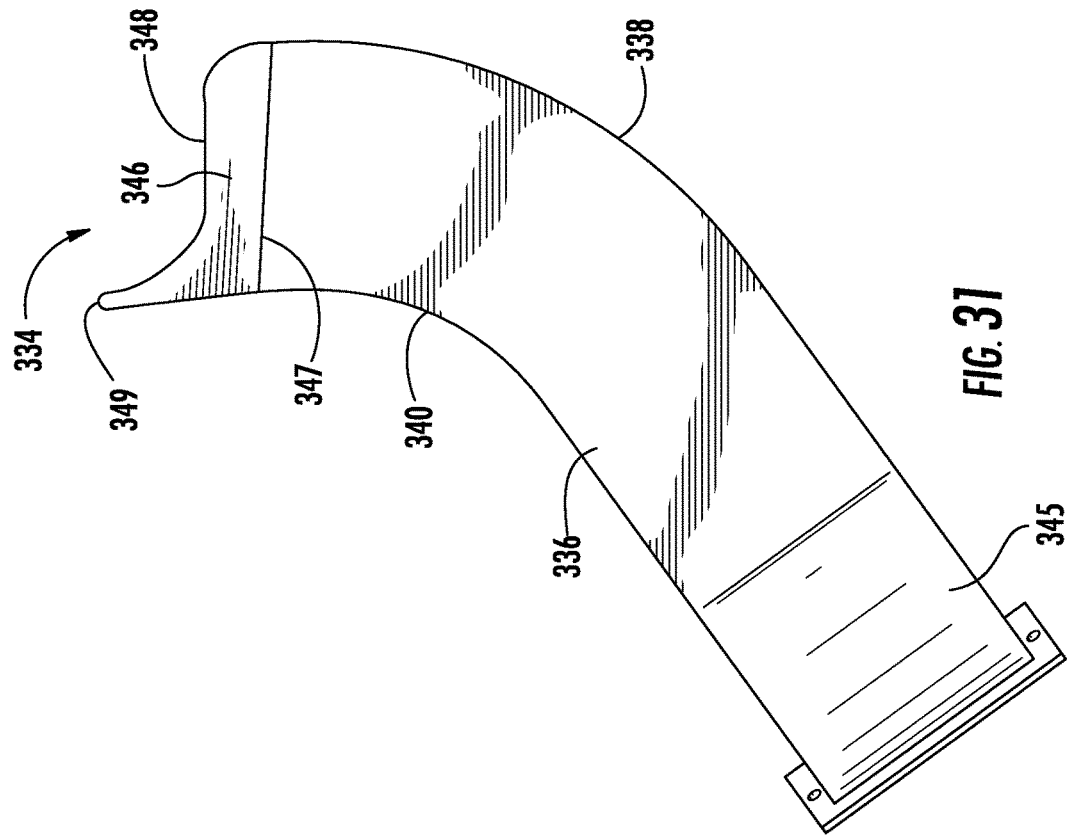
FIG. 31 is a front view of an embodiment of a chute.

With reference to FIGS. 19 and 23, in the illustrated embodiment, the rear wall 242 includes an upper portion 264 and a lower portion 266. The upper portion 264 extends from the lower portion 266 to a generally non-linear, e.g., curved, upper periphery 267. The upper periphery 267 curves upwardly from the sidewall 238 to the sidewall 240. The rear wall 242 also includes an angled extending portion 269. The angled extending portion 269 extends non-parallel to the upper portion 264 of the rear wall 242 from the upper periphery 267 of the upper portion 264 to an upper peripheral edge 271. Thus, the angled extending portion 269 may provide an enlarged central opening 243 configured to provide easy access to the interior of the chute 234 for removed portions of sidewalls of cans.

With reference to FIGS. 28-40, another embodiment of a chute, illustrated as a scrap ring chute 334, is shown. The chute 334 includes many features similar to the previous embodiments.

In the illustrated embodiment, the chute 334 includes angled extending wall 346 extending from the upper periphery 347 of the upper portion 344 of the front wall 336 to an upper peripheral edge 348. The upper peripheral edge 348 is at a highest point 349 proximate the sidewall 340 and slopes downwardly to a generally linear portion 351 which extends to a rounded portion 353 which extends to the sidewall 338.

With reference to FIG. 37, the upper portion 344 of the front wall 336 extends along a plane P3. The angled extending wall 346 extends from the upper portion 344 at an angle θ1 relative to the plane P3. In one embodiment, the angle θ1 is between approximately 5° and approximately 60°. In another embodiment, the angle θ1 is between approximately 10° and approximately 40°. In another embodiment, the angle θ1 is between approximately 25° and approximately 35°. In another embodiment, the angle θ1 is between approximately 26° and approximately 28°. In another embodiment, the angle θ1 is approximately 27°.

In one embodiment, the movement of cans by the can rotation assembly 28 (see FIG. 1) may be adjusted based on the angle θ1 of the angled extending wall 346. The timing, e.g., the point in the revolution of the can around the central axis A, at which cans begin to be moved in a direction away from the cutting assembly while being revolved may be adjusted, e.g., cans may be moved in a direction away from the cutting assembly at a location farther along in the revolution of the can around the central axis A, so that the movement of the can is matched to the angled extending wall 346, e.g., the upper peripheral edge of trimmed can sidewalls will travel past the angled extending wall 346 generally parallel to the angled extending wall 346 within between approximately 0.01 inches and approximately 0.2 inches of the angled extending wall 346. In another embodiment, the timing, e.g., the point in the revolution of the can around the central axis A, at which cans begin to be moved in a direction away from the cutting assembly while being revolved may be adjusted, e.g., cans may be moved in a direction away from the cutting assembly at a location farther along in the revolution of the can around the central axis A, so that the movement of the can is matched to the angled extending wall 346, e.g., the upper peripheral edge of trimmed can sidewalls will travel past the angled extending wall 346 generally parallel to the angled extending wall 346 within between approximately 0.01 inches and approximately 0.2 inches of the angled extending wall 346.

In another embodiment, the angle θ1 of the angled extending wall 346 is configured to match the path of cans past the angled extending wall 346 to the angled extending wall 346, e.g., the upper periphery of the trimmed sidewalls of cans pass within between approximately 0.01 inches and approximately 0.2 inches of at least a portion of the upper peripheral edge 348 of the angled extending wall 346, pass within between approximately 0.01 inches and approximately 0.2 inches of the angled extending wall 346, etc. In another embodiment, the angle θ1 of the angled extending wall 346 is configured to match the path of cans past the angled extending wall 346 to the angled extending wall 346, e.g., the upper periphery of the trimmed sidewalls of cans pass within between approximately 0.01 inches and approximately 0.2 inches of at least a portion of the upper peripheral edge 348 of the angled extending wall 346, pass within between approximately 0.01 inches and approximately 0.2 inches of the angled extending wall 346, etc.

In another embodiment, the speed of revolution of cans around the central axis A relative to the speed and/or timing of the movement of cans in a direction away from the cutting assembly 24 may be adjusted to configure the path of the cans relative to the angled extending wall 346, e.g., configure the path such that the axial periphery of the sidewall of the cans pass within between approximately 0.01 inches and approximately 0.2 inches of at least a portion of the upper peripheral edge 348 of the angled extending wall 346, pass within between approximately 0.01 inches and approximately 0.2 inches of the angled extending wall 346, etc. In another embodiment, the speed of revolution of cans around the central axis A relative to the speed and/or timing of the movement of cans in a direction away from the cutting assembly 24 may be adjusted to configure the path of the cans relative to the angled extending wall 346, e.g., configure the path such that the axial periphery of the sidewall of the cans pass within between approximately 0.02 inches and approximately 0.04 inches of at least a portion of the upper peripheral edge 348 of the angled extending wall 346, pass within between approximately 0.02 inches and approximately 0.04 inches of the angled extending wall 346, etc.

With reference to FIG. 38, the interior chamber of the chute 334 extends a distance D1 between the sidewalls 338 and 340. In one embodiment, the distance D1 is between approximately 2 inches and approximately 7 inches. In another embodiment, the distance D1 is between approximately 3.5 inches and approximately 5.5 inches. In another embodiment, the distance D1 is approximately 4.5 inches. The interior chamber of the chute 334 extends a distance D2 between the front wall 336 and the rear wall 342. In one embodiment, the distance D2 is between approximately 0.25 inches and approximately 3 inches. In another embodiment, the distance D2 is between approximately 0.75 inches and approximately 1.5 inches. In another embodiment, the distance D2 is approximately 1.17 inches.

In one embodiment, the chute 334 includes a radially outwardly extending wall 357 extending outwardly around the chamber of the chute 334 that may be configured to attach the bottom end of the chute 334 to another object, e.g., another chute, a ring disposal mechanism, etc. In one embodiment, the chute 334 includes posts 399 projecting from the rear wall 342. The posts 399 may be configured to be coupled to other objects or worksurfaces to couple the chute 334 thereto, and/or to support the chute 334. In the illustrated embodiment two posts 399 are shown. In other embodiments, other suitable numbers of posts may be provided.

Figures 39, 40:
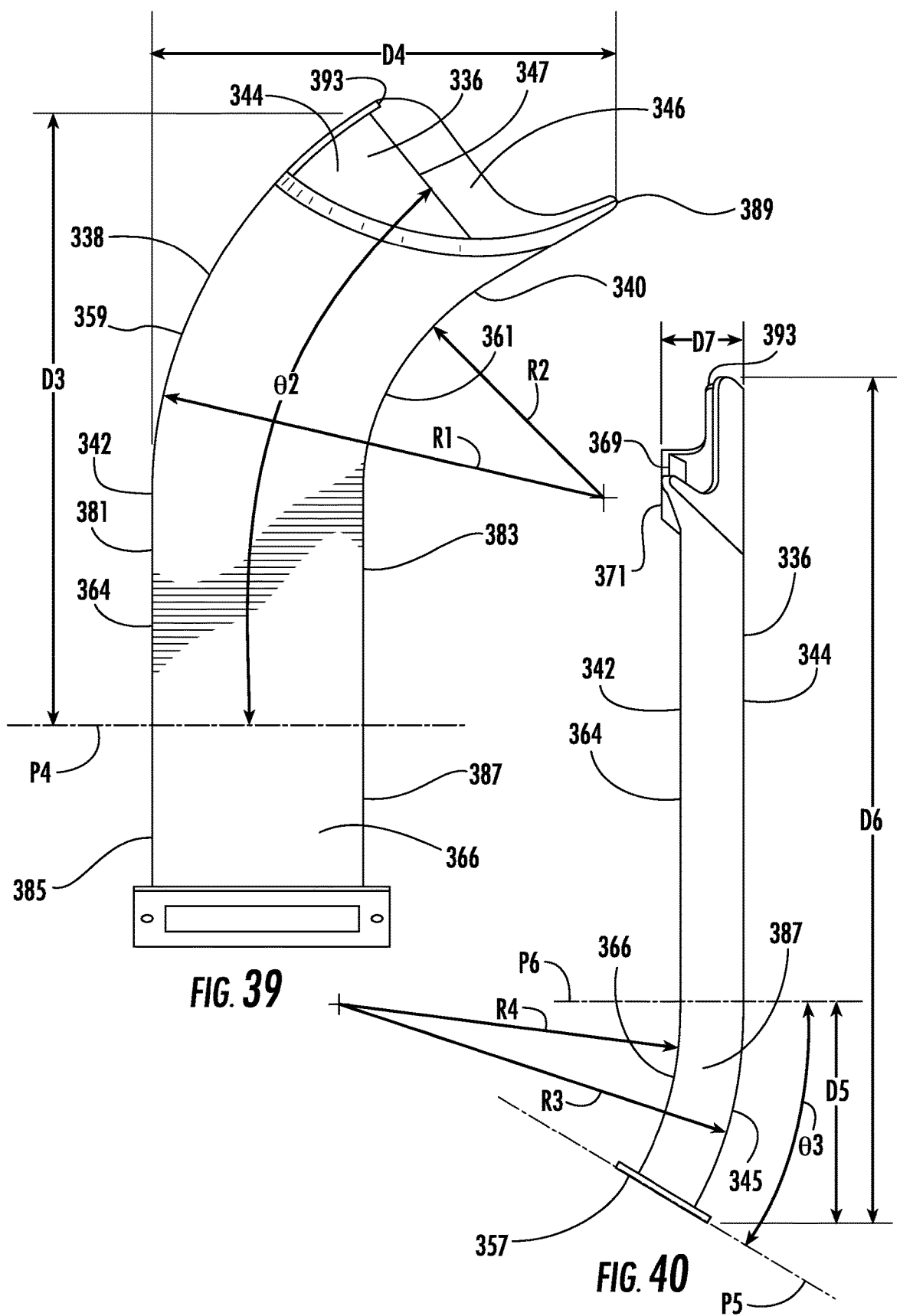
FIG. 39 is a rear dimensional view of an embodiment of a chute.
FIG. 40 is a side dimensional view of an embodiment of a chute.

With reference to FIG. 39, the shape of the upper portion of the chute 334 is described. The upper portion 359 of the sidewall 338 has a radius of curvature R1. In one embodiment, the radius of curvature R1 is between approximately 5 inches and approximately 15 inches. In another embodiment, the radius of curvature R1 is between approximately 7 inches and approximately 13 inches. In another embodiment, the radius of curvature R1 is between approximately 9 inches and approximately 11 inches. In another embodiment, the radius of curvature R1 is approximately 10.25 inches.

With further reference to FIG. 39, the upper portion 361 of the sidewall 340 has a radius of curvature R2. In one embodiment, the radius of curvature R2 is between approximately 2 inches and approximately 10 inches. In another embodiment, the radius of curvature R2 is between approximately 4 inches and approximately 7 inches. In another embodiment, the radius of curvature R2 is between approximately 5 inches and approximately 6 inches. In another embodiment, the radius of curvature R2 is approximately 5.5 inches.

The sidewalls 238 and 240 each include a generally planar portion 381 and 383 extending downwardly from the respective upper portions 359 and 361 to lower portions 385 and 387 that curve as illustrated in FIG. 40.

With further reference to FIG. 39, there is a vertical distance D3 between the junction between planar portion 381 and the lower portion 385 of the sidewall 338 and the upper periphery 347 of the upper portion 344 of the front wall 236 proximate the sidewall 338. In one embodiment, the vertical distance D3 is between approximately 5 inches and approximately 20 inches. In another embodiment, the vertical distance D3 is between approximately 10 inches and approximately 15 inches. In another embodiment, the vertical distance D3 is approximately 13.66 inches.

The junction between the generally planar portion 381 of the sidewall 338 and the lower portion 385 of the sidewall 338 lies in a plane P4. The generally linear upper periphery 347 of the front wall 336 extends in a direction that forms an angle θ2 with the plane P4. In one embodiment, the angle θ2 is between approximately 10° and approximately 90°. In another embodiment, the angle θ2 is between approximately 40° and approximately 60°. In another embodiment, the angle θ2 is between approximately 50° and approximately 52°. In another embodiment, the angle θ2 is approximately 51°.

With further reference to FIG. 39, the generally planar portion 381 of the sidewall 338 is located a horizontal distance D4 from the upper peripheral edge 389 of the sidewall 340. In one embodiment, the horizontal distance D4 is between approximately 5 inches and approximately 20 inches. In another embodiment, the horizontal distance D4 is between approximately 8 inches and approximately 12 inches. In another embodiment, the horizontal distance D4 is approximately 10.61 inches.

With reference to FIG. 40, there is a vertical distance D5 from the junction between the upper portion 344 and the lower portion 345 of the front wall 336. In one embodiment, the vertical distance D5 is between approximately 1 inch and approximately 10 inches. In another embodiment, the vertical distance D5 is between approximately 3 inches and approximately 7 inches. In another embodiment, the vertical distance D5 is between approximately 4.5 inches and approximately 5.5 inches. In another embodiment, the vertical distance D5 is approximately 4.935 inches.

With further reference to FIGS. 39 and 40, there is a vertical distance D6 between the lower periphery of the outwardly extending wall 357 proximate the front wall 344 and the upper periphery 393 of the sidewall 338. In one embodiment, the vertical distance D6 is between approximately 5 inches and approximately 30 inches. In another embodiment, the vertical distance D6 is between approximately 10 inches and approximately 25 inches. In another embodiment, the vertical distance D6 is between approximately 15 inches and approximately 20 inches. In another embodiment, the vertical distance D6 is approximately 18.91 inches.

With further reference to FIG. 40, the outwardly extending wall 357 extends along a plane P5. The junction between the upper portion 344 of the front wall 336 and the lower portion 345 of the front wall 345 lies in a plane P6. The planes P5 and P6 form an angle θ3 between them. In one embodiment, the angle θ3 is between approximately 5° and approximately 60°. In another embodiment, the angle θ3 is between approximately 15° and approximately 40°. In another embodiment, the angle θ3 is approximately 30°.

With further reference to FIG. 40, the lower portion 345 of the front wall 336 has a radius of curvature R3. In one embodiment, the radius of curvature R3 is between approximately 1 inch and approximately 20 inches. In another embodiment, the radius of curvature R3 is between approximately 5 inches and approximately 15 inches. In another embodiment, the radius of curvature is between approximately 9 inches and approximately 10 inches. In another embodiment, the radius of curvature is approximately 9.22 inches.

Wither further reference to FIG. 40, the lower portion 366 of the rear wall 342 has a radius of curvature R4. In one embodiment, the radius of curvature R4 is between approximately 1 inch and approximately 20 inches. In another embodiment, the radius of curvature R4 is between approximately 4 inches and approximately 10 inches. In another embodiment, the radius of curvature R4 is between approximately 7 inches and approximately 8 inches. In another embodiment, the radius of curvature R4 is approximately 7.8 inches.

With further reference to FIG. 40, the upper peripheral edge 371 of the angled extending portion 369 of the rear wall 342 is a horizontal distance D7 from the front wall 336. In one embodiment, the distance D7 is between approximately 1 inch and approximately 5 inches. In another embodiment, the distance D7 is between approximately 1.5 inches and approximately 2.5 inches. In another embodiment, the distance D7 is approximately 1.82 inches.

With reference to FIG. 41, the angled extending portion 346 extends a distance D8 from the upper periphery 347 of the upper portion 344 of the front wall 336 to the upper peripheral edge 348 of the angled extending portion 346 proximate the highest point 349 of the upper peripheral edge 348. In one embodiment, the distance D8 is between approximately 1 inch and approximately 10 inches. In another embodiment, the distance D8 is between approximately 2 inches and approximately 5 inches. In another embodiment, the distance D8 is between approximately 3 inches and approximately 4 inches. In another embodiment, the distance D8 is approximately 3.5 inches.

With further reference to FIG. 41, the angled extending wall portion 346 extends a distance D9 from the upper periphery 347 of the upper portion 344 of the front wall 336 to the upper peripheral edge 348 of the angled extending portion 346 proximate the linear portion 351 of the upper peripheral edge 348. In one embodiment, the distance D9 is between approximately 0.5 inches and approximately 3 inches. In another embodiment, the distance D9 is between approximately 0.75 inches and approximately 1.5 inches. In another embodiment, the distance D9 is approximately 1.11 inches.

The upper peripheral edge 371 of the angled extending portion 369 has a radius of curvature R5. In one embodiment, the radius of curvature R5 is between approximately 1 inch and approximately 10 inches. In another embodiment, the radius of curvature R5 is between approximately 4 inches and approximately 8 inches. In another embodiment, the radius of curvature R5 is between approximately 6 inches and approximately 7 inches. In another embodiment, the radius of curvature R5 is approximately 6.75 inches.

With further reference to FIG. 41, the upper periphery 367 of the upper portion 344 of the front wall 336 has a radius of curvature R6. In one embodiment, the radius of curvature R6 is between approximately 1 inch and approximately 12 inches. In another embodiment, the radius of curvature R6 is between approximately 5 inches and approximately 9 inches. In another embodiment, the radius of curvature R6 is between approximately 7 inches and approximately 8 inches. In another embodiment, the radius of curvature is approximately 7.15 inches.

As illustrated in FIG. 41, the upper peripheral edge 348 of the angled extending portion 346 has a portion between the highest point 349 and the generally linear portion 351 with a radius of curvature R7. In one embodiment, the radius of curvature is between approximately 0.25 inches and approximately 4 inches. In another embodiment, the radius of curvature R7 is between approximately 0.75 inches and approximately 2 inches. In another embodiment, the radius of curvature R7 is between approximately 1 inch and approximately 1.5 inches. In another embodiment, the radius of curvature R7 is approximately 1.38 inches.

With further reference to FIG. 41, the upper peripheral edge 348 of the angled extending portion 346 includes a portion between the generally linear portion 351 and the sidewall 338 that has a radius of curvature R8. In one embodiment, the radius of curvature R8 is between approximately 0.25 inches and 4 inches. In another embodiment, the radius of curvature R8 is between approximately 0.5 inches and 2 inches. In another embodiment, the radius of curvature R8 is between approximately 1 inch and approximately 1.5 inches. In another embodiment, the radius of curvature R8 is approximately 1.33 inches.

Embodiments of chutes may be made from steel, aluminum, other metals, plastic, or any other suitable material. In one embodiment, a chute is formed from 304 stainless steel 10-gauge.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

According to exemplary embodiments, the cans discussed herein are formed from metal, and specifically may be formed from, stainless steel, tin-coated steel, aluminum, etc.

In some embodiments, the cans discussed herein are formed from aluminum. In some embodiments, the cans may be formed from other metals or materials (e.g., polymers, high-temperature plastic, thermoplastics, cardboard, ceramic, etc.).

Cans discussed herein may include containers of any style, shape, size, etc. For example, the cans discussed herein may be shaped such that cross-sections taken perpendicular to the longitudinal axis of the cans are generally circular. However, in other embodiments the sidewall of the cans discussed herein may be shaped in a variety of ways (e.g., having other non-polygonal cross-sections, as a rectangular prism, a polygonal prism, any number of irregular shapes, etc.) as may be desirable for different applications or aesthetic reasons. In various embodiments, the sidewall of a can may include one or more axially extending sidewall sections that are curved radially inwardly or outwardly such that the diameter of the can is different at different places along the axial length of the can, and such curved sections may be smooth continuous curved sections. In one embodiment, cans may be hourglass shaped. Cans may be of various sizes (e.g., 3 oz., 8 oz., 12 oz., 15 oz., 28 oz, etc.) as desired for a particular application.

In various embodiments, trimmed sidewalls of cans may be coupled to a closure, such as a can end, to close the can, e.g., in one embodiment, by a "double seam" formed from the interlocked portions of material of the can sidewall and the can end. However, in other embodiments, the can ends discussed herein may be coupled to the sidewall via other mechanisms. For example, can ends may be coupled to the sidewall via welds or solders.

The containers discussed herein may be used to hold perishable materials (e.g., food, drink, pet food, milk-based products, etc.). It should be understood that the phrase "food" used to describe various embodiments of this disclosure may refer to dry food, moist food, powder, liquid, or any other drinkable or edible material, regardless of nutritional value. In other embodiments, the containers discussed herein may be used to hold non-perishable materials or non-food materials. In various embodiments, the containers discussed herein may contain a product that is packed in liquid that is drained from the product prior to use. For example, the containers discussed herein may contain vegetables, pasta or meats packed in a liquid such as water, brine, or oil.

According to various exemplary embodiments, the inner surfaces of the cans may include a liner (e.g., an insert, coating, lining, a protective coating, sealant, etc.). The protective coating acts to protect the material of the can from degradation that may be caused by the contents of the can. In an exemplary embodiment, the protective coating may be a coating that may be applied via spraying or any other suitable method. Different coatings may be provided for different food applications. For example, the liner or coating may be selected to protect the material of the container from acidic contents, such as carbonated beverages, tomatoes, tomato pastes/sauces, etc. The coating material may be a vinyl, polyester, epoxy, EVOH and/or other suitable lining material or spray. The interior surfaces of the container ends may also be coated with a protective coating as described above.

What is claimed is:

1. A trimmer assembly for trimming metal cans comprising:
   an infeed configured to deliver metal cans;
   a discharge configured to receive the metal cans after being trimmed;
   a revolving assembly configured to receive each of the metal cans from the infeed and deliver the metal cans after being trimmed to the discharge, the revolving assembly being configured to revolve the metal cans around an axis;
   a cutter configured to remove a portion from each metal can; and
   a chute configured to receive the removed portion of each metal can, the chute including a first wall proximate the revolving assembly, the first wall including a lower portion extending upwardly generally perpendicular to the axis and an upper portion extending upwardly non-perpendicular to the axis from the lower portion to a first peripheral edge of the first wall, the upper portion being configured to prevent the removed portion of each metal can from moving past the chute in a direction parallel with the axis.

2. The trimmer assembly of claim 1, further comprising a sensor configured to sense the removed portions passing through the chute.

3. The trimmer assembly of claim 2, further comprising a controller configured to monitor removal of portions of sidewalls of the metal cans and to emit a signal when the sensor does not sense a portion of a sidewall of a metal can in the chute after the controller monitors removal of the portion of the sidewall of the metal can.

4. The trimmer assembly of claim 1, wherein the first peripheral edge of the first wall extends generally linearly.

5. The trimmer assembly of claim 1, wherein the first peripheral edge of the first wall extends non-linearly.

6. The trimmer assembly of claim 1, wherein the chute includes a second wall opposite the first wall proximate the cutter and a pair of sidewalls extending between the first wall and the second wall, the first and second walls and pair of sidewalls defining a passage configured to receive the removed portion from each metal can.

7. The trimmer assembly of claim 6, wherein the upper portion of the first wall extends upwardly and in a direction toward the second wall such that the first peripheral edge of the first wall is located between the lower portion of the first wall and the second wall.

8. The trimmer assembly of claim 6, wherein one of the sidewalls extends higher than the other of the sidewalls;
   wherein the passage includes a first portion extending downwardly, a second portion curving away from the first portion in a direction toward the discharge, and a third portion curving away from the second portion in a direction toward the cutter.

9. The trimmer assembly of claim 1, wherein the upper portion of the first wall extends at an angle or between approximately 15° and approximately 40° relative to the lower portion of the first wall.

10. The trimmer assembly of claim 1, further comprising a vacuum source configured to draw the removed portions of each of the metal cans into the chute.

11. A method of removing a portion of a sidewall from a can comprising:
   rotating the can around a longitudinal axis of the can;
   revolving the can in around a first axis while moving the can toward a cutter configured to remove the portion of the sidewall;
   removing the portion of the sidewall of the can; and
   revolving the can around the first axis while moving the can away from the cutter;

wherein at least a portion of a path of the can away from the cutter is parallel to an upper wall portion of a chute, the upper wall portion extending non-perpendicular to the first axis.

12. The method of claim 11, further comprising sensing when the removed portion of the sidewall of the can passes through the chute.

13. The method of claim 11, wherein the portion of the path of the can is between removal of the portion of the sidewall of the can and discharging of the can with the portion of the sidewall removed.

14. The method of claim 11, further comprising indicating if the removed portion of the sidewall of the can does not pass through the chute.

15. A chute for receiving a removed portion of a sidewall of a can, the portion of the sidewall of the can having been removed by a cutter while the can is rotated about its central axis and revolved around a first axis, the chute comprising:
- a first wall including a lower portion having an outer surface and an angled extending upper portion having an outer surface, the outer surface of the upper portion extending generally along a first plane from a first end proximate the lower portion to an upper peripheral edge, the outer surface of the lower portion extending generally along a second plane, the first and second planes being non-parallel and non-co-planar, the first plane extending at an angle of between approximately 15° and 40° relative to the second plane; and
- a second wall opposite the first wall extending from a first end to an upper peripheral edge;
- a pair of sidewalls extending between the first wall and the second wall, the first and second walls and the pair of sidewalls defining an opening configured to receive the removed portion of the sidewall of the can and a passage extending from the opening;
- wherein the upper peripheral edge of the upper portion of the first wall is located above the opening between the second wall and the lower portion of the first wall.

16. The chute of claim 15, further comprising a first sidewall and a second sidewall opposite the first sidewall, the sidewalls extending between the first wall and the second wall, the first sidewall and the second sidewall extending parallel to one another along the passage.

17. The chute of claim 16, wherein the second wall includes a lower portion and an upper portion extending from the lower portion to an upper peripheral edge; and
- wherein the upper portion extends non-parallel to the first portion.

18. The chute of claim 17, wherein the upper peripheral edge of the upper portion of the second wall extends from a first end proximate the first sidewall to a second end proximate the second sidewall; and
- wherein the upper peripheral edge of the upper portion of the second wall is at a first height proximate the first sidewall and is at a second height proximate the second sidewall, the second height being greater than the first height.

19. The chute of claim 18, wherein the first sidewall includes a first portion having a first width below the upper portion of the second wall and a second portion having a second width above the upper portion of the second wall, the first width being greater than the second width.

20. The chute of claim 15 wherein the passage defined by the first wall and the second wall has a first portion that curves in a third plane and a second portion that curves in a fourth plane different from the third plane.

* * * * *